US012280517B2

(12) United States Patent
Bui

(10) Patent No.: US 12,280,517 B2
(45) Date of Patent: Apr. 22, 2025

(54) EMBRYO LOADING DEVICE USED FOR VENEER HORIZONTAL JOINTING MACHINE

(71) Applicant: Trong Tin Bui, Ho Chi Minh (VN)

(72) Inventor: Trong Tin Bui, Ho Chi Minh (VN)

( * ) Notice: Subject to any disclaimer, the term of this patent is extended or adjusted under 35 U.S.C. 154(b) by 195 days.

(21) Appl. No.: 17/428,603

(22) PCT Filed: Apr. 29, 2020

(86) PCT No.: PCT/VN2020/000002
§ 371 (c)(1),
(2) Date: Aug. 4, 2021

(87) PCT Pub. No.: WO2021/011968
PCT Pub. Date: Jan. 21, 2021

(65) Prior Publication Data

US 2022/0118642 A1 Apr. 21, 2022

(30) Foreign Application Priority Data

Jul. 12, 2019 (VN) .............................. 1-2019-03757

(51) Int. Cl.
*B27D 1/10* (2006.01)
*B27M 3/00* (2006.01)

(52) U.S. Cl.
CPC ............. *B27D 1/10* (2013.01); *B27M 3/0026* (2013.01)

(58) Field of Classification Search
CPC .......... B27D 1/10; B27B 25/02; B27B 31/003
See application file for complete search history.

(56) References Cited

U.S. PATENT DOCUMENTS

| | | | | | |
|---|---|---|---|---|---|
| 1,805,907 | A * | 5/1931 | Dennis | B27D 1/10 | 156/545 |
| 1,903,373 | A * | 4/1933 | Dennis | B27D 1/10 | 156/546 |
| 2,371,331 | A * | 3/1945 | Irwin | B27D 1/10 | 156/545 |
| 2,539,646 | A * | 1/1951 | Welch, Jr. | B29C 65/04 | 333/125 |
| 2,687,754 | A * | 8/1954 | McFall | B27D 1/10 | 156/545 |
| 4,414,050 | A | 11/1983 | Bernath | | |
| 4,545,845 | A * | 10/1985 | Biewald | B27D 1/10 | 156/304.3 |
| 2008/0017297 | A1 * | 1/2008 | Tanaka | B29C 66/8242 | 156/110.1 |

FOREIGN PATENT DOCUMENTS

| | | | |
|---|---|---|---|
| CN | 202129388 | U | 2/2012 |
| JP | 2013086308 | A | 5/2013 |
| KR | 100998761 | 81 | 12/2010 |

OTHER PUBLICATIONS

International Search Report of PCT/VN2020/000002 published on Jan. 21, 2021.
Written opinion of PCT/VN2020/000002 published on Jan. 21, 2021.

* cited by examiner

*Primary Examiner* — Jared O Brown

(57) ABSTRACT

An embryo loading device for receiving and rolling first and second veneer sheets and joining the first and second veneer sheets to each other each other, including: a sliding table (2); a guide bar (2.1) provided on a top surface of the sliding table (2); a clutch gear wheel part (3) provided under the sliding table (2); a rolling wheel part (4) provided over the guide bar (2.1); and a pair of box-shaped frames (3T, 3P) housing the clutch gear wheel part (3).

7 Claims, 24 Drawing Sheets

EMBRYO LOADING DEVICE USED FOR VENEER HORIZONTAL JOINTING MACHINE

TECHNICAL FIELD

The invention relates to the field of wood processing technology, to an embryo loading device used for the veneer horizontal jointing machine.

BACKGROUND OF THE INVENTION

A technical solution involving an embryo loading device with a rolling shaft and a horizontal roller used for the veneer horizontal jointing machine has been used previously in the wood veneer processing industry (FIG. 1*a*) comprises a pair of rollers close to each other, having a cohesive structure and the same horizontal shaft perpendicular to the guide bar that are arranged under the sliding table and the circle of the rollers tangential to the surface of the sliding table are rotated round in the direction of rolling of the guide bar. Above the pair of the rollers is a pair of rolling wheels, each of which has an independent horizontal shaft which is not perpendicular to the guide bar and deviates from the rollers by an angle about 2-5 degrees, when viewed from the top, two shafts of the rolling wheel create an obtuse angle about 184 to 190 degrees in the front of the direction of the guide bar. A pair of free-rotating rolling wheels (not driven) can be shrugged up and pressed down at the same time and adjusted to press on the rollers with adjustable pressure.

When the machine operates, two veneer sheets loaded on the ends of the guide bar will be fed into the machine by two rolling wheels on the top and two rollers on the bottom. With this structure, two veneer sheets are rolled into the machine in the direction of the guide bar, at the same time are spliced together at two opposite sides at the thickness thereof.

The disadvantage of this solution is that the rolling wheel and rollers have no parallel shaft each other, so when the machine operates, they only interact with each other at one point via the veneer sheet, thus not creating a stable effect and not easy to use.

Also known is the embryo loading device that has a rolling wheel arranged on the surface of a rotating disc (FIG. 1*b*) comprises two vertical round discs arranged side by side on both sides of the guide bar, behind a workpiece loading mouth (workpiece consists of two veneer sheets), the upper side of two round discs is a rough surface that is placed on par with the machine's sliding table and is driven in opposite directions. When viewed from the direction of loading the workpiece, the left round disc rotates counterclockwise and the right round disc rotates clockwise. Above the two sides of the rotating disc is a pair of free-rotating rolling wheels (not driven) having a cohesive structure and the same rotating shaft, the rolling wheel shaft is horizontal and perpendicular to the guide bar, parallel to the radial straight line of both sides of the rotating disc, the rolling shaft does not cut vertically with the rotating disc shaft but deviates back (according to the direction of the guide bar) a distance from 2 mm to 5 mm. The pair of rolling wheels can be shrugged up and pressed down at the same time and adjusted to press on the outside rim of the disc with adjustable pressure.

When the machine operates, two veneer sheets loaded on the ends of the guide bar will be rolled into the machine by two rolling wheels on the top and two rotating discs on the bottom. With this structure, two veneer sheets are rolled into the machine in the direction of the guide bar, at the same time two opposite sides at the thickness thereof are spliced together.

The disadvantage of this solution is that while the machine is operating, the underside of the veneer sheet will be exposed and rubbed against the upper rough surface of the rotating disc, which will be peel and produce fine wood dust. This fine wood dust accumulates and attaches to many other parts of the machine, so it takes effort to clean, especially fine wood dust that easily falls into the glue container to damage the glue. In addition, fine wood dust also scratches seams of the veneer sheets, especially when the thickness of the veneer sheet is high, the friction between the veneer sheets with the surface of the disc will be higher. Moreover, due to the pair of rolling wheels are cohesive together, so that in case two veneer sheets have uneven thickness, it will lose the squeezing effect in thinner veneer sheets.

SUMMARY OF THE INVENTION

The invention proposes an embryo loading device used for the veneer horizontal jointing machine (hereinafter referred to as the machine) with the function of receiving and rolling two veneer sheets into the machine at the same time, simultaneously joining two glued sides of each other. Two veneer sheets are always opposite each other, allows the machine always to achieve a stable squeezing effect, a layer of glue applied on the surface of two veneer sheets is evenly, helping the seams of two veneers are aligned without extruding, scratching or peeling.

In order to achieve the above-mentioned purpose, the embryo loading device used for veneer horizontal jointing machine according to this invention is characterized in that comprising: a clutch gear wheel and a rolling wheel part.

According to the first embodiment of the invention, the first different factor of the embryo loading device according to the invention is that the clutch gear wheel part formed by two shaped box frames, a pair of clutch gear wheels, two drive shafts and gears.

Two shaped box frames are installed side by side and opposite each other on both sides of the guide bar, under a sliding table of the machine and behind the mount of feeding splint (also as workpiece loading mouth). The upper side of the shaped box frame is arranged a flat sliding surface mounted on par with the sliding table of the machine on two sides of the guide bar, wherein one shaped box frame on one side of the guide bar can be adjusted higher than the sliding table surface a distance that corresponds to the thickness of the veneer sheet. The maximum distance is about 5 mm in case of the veneer sheet with a thickness from 1.5 to 5 mm and it cannot bend when it comes into the gluing stage in the operation process of the machine.

A pair of equally designed clutch gear wheels are rotationally driven by the same number of revolutions in the direction of rolling the workpiece into the machine and arranged opposite each other in two shaped box frames placed side by side on both sides of the guide bar, under the sliding table of the machine and behind the workpiece loading mouth. Each clutch gear wheel is installed in a separate shaped box frame and driven by gears so that two clutch gear wheels can rotate in the same direction with the same number of revolutions. The shaft of each clutch gear wheel is inclined, upwards on the small diameter of the clutch at an angle equal to the taper of the clutch wheel, so that the generating line of the cone is tangent from below and on par to the surface of the sliding table. The tapering degrees of the clutch wheel and the inclination of the clutch shaft are ranged from 0.1 to 89.9 degrees.

The two clutch gear wheels are close to the guide bar bulkhead on the both sides of the guide bar and opposite each other via the large diameter of the cone, on the cone surface of the clutch gear wheel is roughened. At the small conical end of the clutch wheel is a bevel gear that is rotated by the bevel gear with a vertical shaft, the lower end of this vertical shaft fitted with a transmission gear that is connected to the gear of the shaped box frame on the other side of the guide bar and rotationally driven by the motor.

A further different factor of the embryo loading device according to the first embodiment of the invention is that the rolling wheel part is formed by a pair of equal double rolling wheels and arranged on a pair of clutch gear wheels. The horizontal shaft of the pair of double rolling wheels is perpendicular to the guide bar and is arranged opposite each other on both sides of the guide bar. A pair of free-rotating double rolling wheels (not driven) can be shrugged up and pressed down with adjustable pressure.

Each of the double rolling wheel with a separate shaft and two thin rolling wheel is characterized in that comprising: a main rolling wheel and an auxiliary rolling wheel rotating separately without adhere each other and are arranged a distance each from other to make the width of each double rolling wheel is equivalent to the length of the generating line on the cone of each clutch wheel; a round surface of the main and auxiliary rolling wheel is smooth or rough with a roughness from small to large to suit the actual effect; and two main rolling wheels of a pair of double rolling wheels are linked together via a polycentric coupling, so that they can always rotate with the same number of revolutions.

The double rolling wheels are made up of a rolling wheel rim which can be rotated around a fixed shaft by linking each other with two bearings. The surface around the rolling wheel rim has two parts: the large diameter part used to install the main rolling wheel, between the main rolling wheel and the large diameter surface of a rolling wheel rim is padded with a rubber ring pad with a function of making the main rolling wheel can be shrugged up and pressed down eccentrically with the shaft when operating.

The auxiliary rolling wheel is a circular rim, the outside diameter thereof being equal to the outside diameter of the main rolling wheel that can freely rotate by linking between a bearing and a surface of the inside small diameter of the rolling wheel rim. Between the auxiliary rolling wheel and the outer round surface of the bearings of the auxiliary rolling wheel is also padded with a rubber ring pad with the function of making the auxiliary rolling wheel can be shrugged up and pressed down eccentrically with the rolling wheel rim when operating.

A double rolling wheel on one side of the guide bar can be adjusted to lift up corresponding to the height of a shaped box frame at the same side in case of necessity. On the opposite side of two main rolling wheels and between two double rolling wheels is two sliding pins, that are spaced at a distance so that the center of the main rolling wheel becomes the midpoint of straight segment between two sliding pins.

Between the two main rolling wheels is arranged a coin shaped polycentric coupling, on the surface of the coin of the polycentric coupling there are four sliding grooves arranged evenly and faced into the center, the width of the sliding groove fits snugly with the sliding pin on the side face of each main rolling wheel and the length of the sliding groove meets the stroke back and forward, enough that when this coupling mechanism operates, it will has the function of making the two main rolling wheels always rotate with the same number of revolutions, even if eccentrically each other with the deviation corresponding to the maximum thickness of the veneer sheets.

When the machine operates, two veneer sheets are loaded on either side of the feeding splint on either side of the guide bar and are blocked by two embryo positioning cylinders, two veneer sheets are pressed down from above by a pair of clutch gear wheels arranged under the surface of the sliding table and two double rolling wheels, at the same time two heads of the embryo positioning cylinder leave away from the surface of the sliding table when receiving a signal from the photoelectric sensor receiving workpiece (sensor), that to make two veneer sheets to be rolled and put into the machine, and at the same time pressed the two sides of the two veneer sheets together by the impact of the conical surface of the two clutch gear wheels to make the two veneer sheets both move into the machine in the direction of the guide bar and horizontal drift toward the big conical head (the ratio of taper degrees as higher the level of horizontal drift toward the big conical head as more) until the sides of two veneer sheets pressed close to both sides of the guide bar bulkhead of the guide bar and moving into the machine.

Two main rolling wheels of the two double rolling wheels are pressed close to both sides of the guide bar bulkhead, the upper side corresponds to the surface at the big end of the two clutch gear wheels bottom, that always rotate with the same number of revolutions to create the press down effect to make the clutch gear wheel effective, at the same time to keep the two veneer sheets moving at the same speed, even in case of the veneer sheets with a large thickness that cannot be bent when moving through the glue applicator.

The two auxiliary rolling wheels is outside the two double rolling wheels, on both sides of the guide bar corresponding to the surface at the small end of the two clutch gear wheels below, that is able to shrug up and press down along the same shaft with the main rolling wheel of the double rolling wheels, at the same time is also able to shrug up and press down independently to create a continuous downward pressure effect to make the clutch gear wheel below effective, even in case the surface and thickness of the veneer sheet are not equal.

LIST OF REFERENCE NUMBERS IN THE PICTURES

1 Machine body

2 Sliding table: 2.1 Guide bar; 2.1.1 Guide bar bulkhead; 2.1.2 Feeding splint; 2.1.3 Glue splint; 2.1.4 Pads; 2.1.5 Cover piece; 2.2 Glue applicator; 2.3.8T lower left wheel

3 Clutch gear wheel part: 3T Left shaped box frame; 3P Right shaped box frame; 3.1 Clutch wheels; 3.1.1 Clutch gear; 3.1.2 Clutch gear shaft; 3.2 Drive shaft; 3.2.1 Clutch gear; 3.2.2 Gears; 3.3 Pinion

4 Rolling wheel rails: 4K Double rolling wheels; 4.1 Rolling wheel rim; 4.1.1 Rolling wheel shaft; 4.1.1C Clutch roller shaft; 4.1.2 Sliding pin; 4.1.3 Bearing; 4.1C Clutched roller; 4.2 Main rolling wheel; 4.2.1 Main rolling o'ring gaskets; 4.3 Auxiliary rolling wheel; 4.3.1 Rubber o'ring gaskets; 4.4 Polycentric coupling; 4.5 Sliding rails; 4.5.1 Drives sliding rails; 4.5C The back of sliding rails

5 Upper Hinge chain parts: 5.1 Upper tension frame; 5.1.1 Horizontal platform; 5.1.2 Pads; 5.2 Upper horizontal sprocket; 5.3T Left rolling wheel; 5.3P Right rolling wheel; 5.4 Middle horizontal roller; 5.5 Pair of ends horizontal rollers

6 Under hinge chain parts: 6.1 Under tension frame; 6.2 Horizontal wheel; 6.3 Horizontal wheel

7 Vertical screw; 7.1 Vertical pillar

X1 Embryo positioning cylinder; X2 Positioning cylinder; X3 Compression cylinder; X4 Lifting cylinder

S1 photoelectric sensor receiving workpiece

DETAILED DESCRIPTION

Hereinafter, preferred embodiments of the present invention will be described in detail with reference to the accompanying drawings FIGS. 2*a*-18.

Figure 1A:
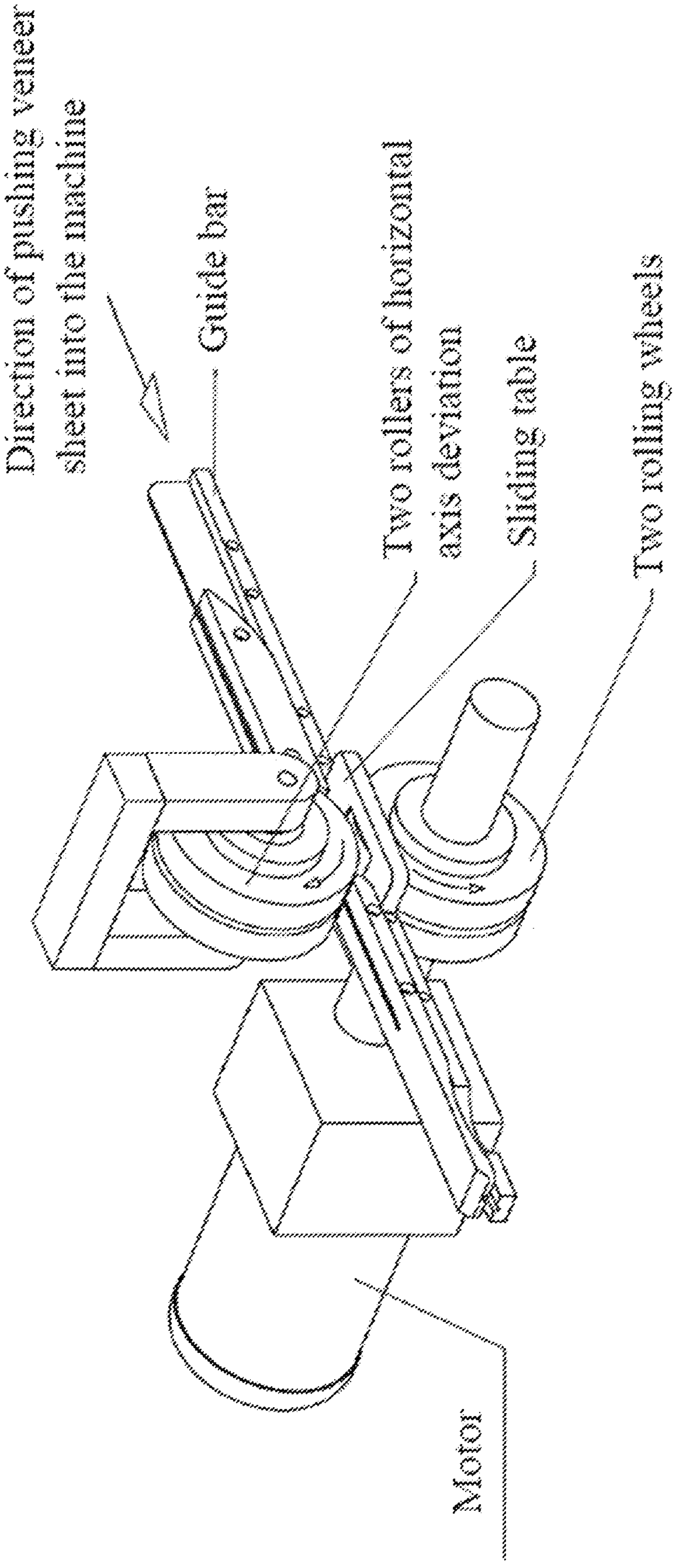
FIG. 1a (Prior Art)
FIG. 1*a* is a perspective drawing showing the embryo loading device used for the veneer horizontal jointing machine according to the known technical solution with a rolling shaft and a horizontal roller are deviate from each other and FIG. 1*b* is a perspective drawing showing the rolling mechanism arranged on the surface of the rotating disk that is used for the veneer horizontal jointing machine according to the known technical solution.
Figure 1B:
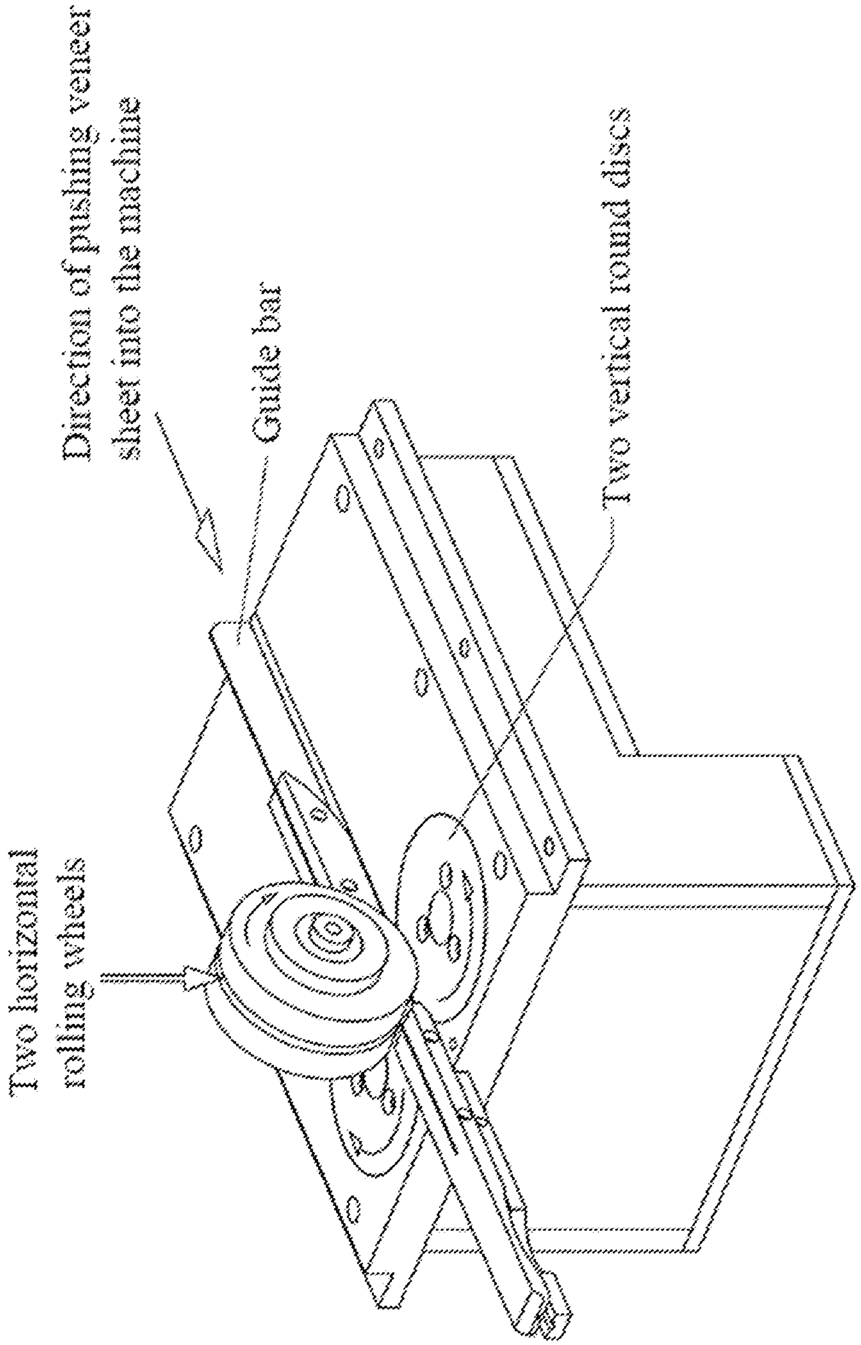
FIG. 1b (Prior Art)
Figure 2A:
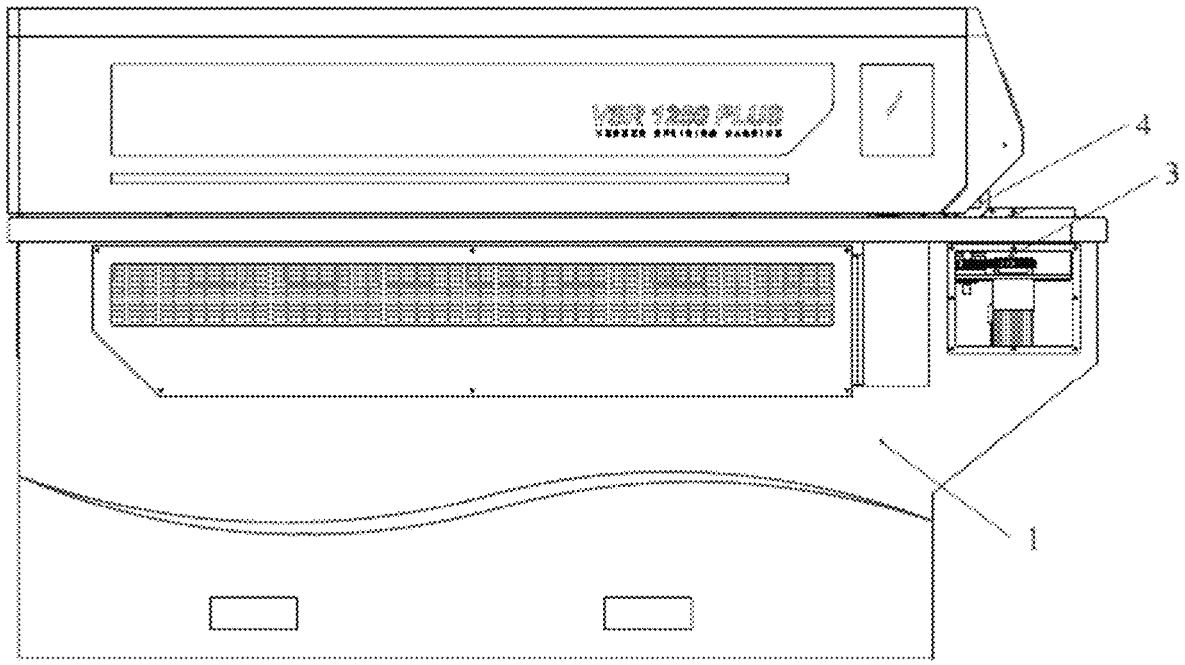
FIG. 2*a* is a schematic left side view illustrating of the veneer horizontal jointing machine using the embryo loading device according to the invention.
Figure 2B:
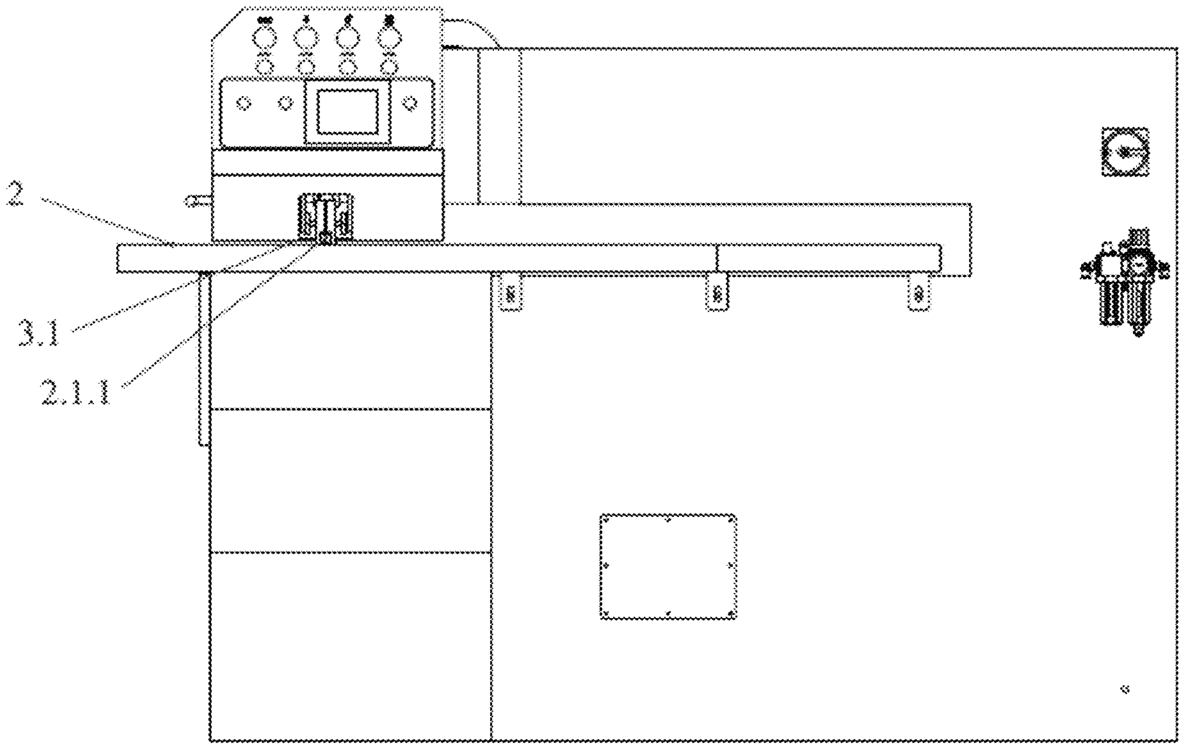
FIG. 2*b* is a schematic front view illustrating the veneer horizontal jointing machine using the embryo loading device according to the invention.

As shown in FIGS. 2*a*-2*b*, the veneer horizontal jointing machine (hereinafter referred to as the machine) using the embryo loading device comprises: a machine body 1, a sliding table 2, a clutch gear wheel 3 and a rolling wheel 4.

Machine body 1 has an inverted C-shape with the inlet part to be compatible with the standard width size of the finished veneer boards. The sliding table 2 is arranged below the underside of the inverted C of the machine.

The clutch gear wheel 3 is located at the under the inverted C-shape of machine body land is flush with the surface of sliding table 2. The rolling wheel 4 is located at the upper the inverted C-shape of the machine body 1. The guide bar 2.1 has a guide bar bulkhead 2.1.1 to load two pieces of veneer at the same time and glue the two edges together. The rolling wheel 4 is arranged above the clutch gear wheel 3.

Figure 3:
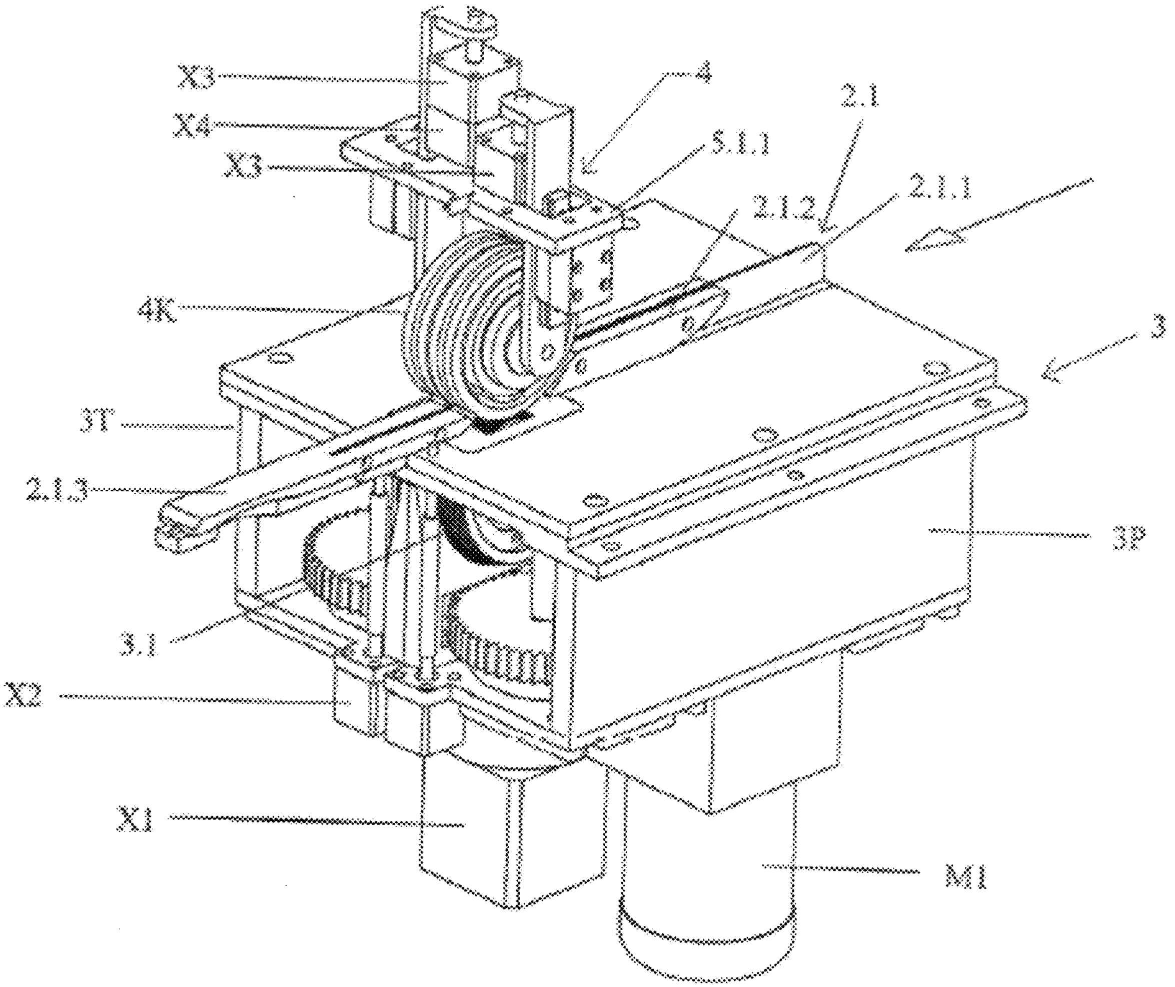
FIG. 3 is a schematic perspective view illustrating the detailed composition of the embryo loading device according to the invention with the guide bar.
Figure 4:
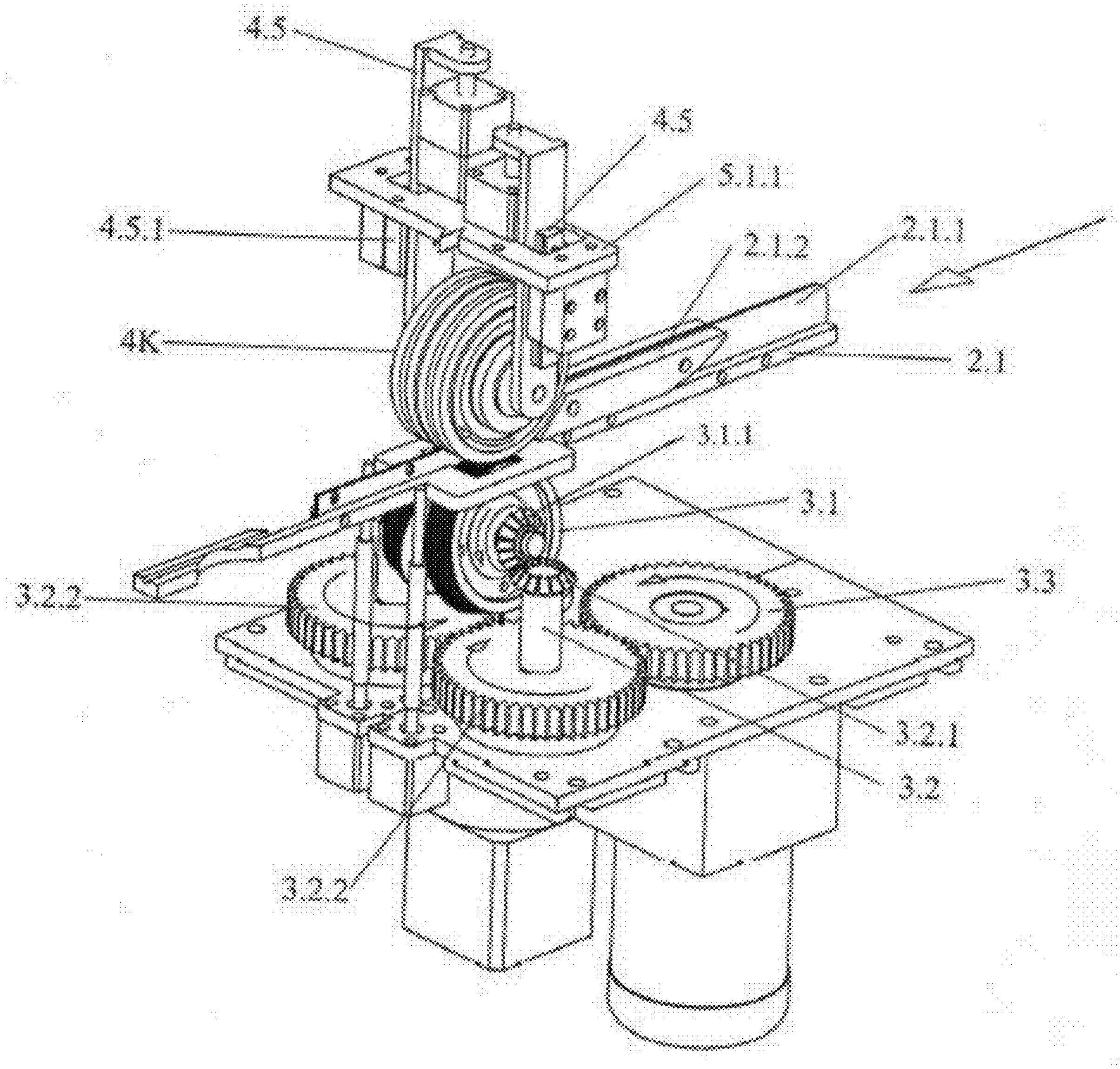
FIG. 4 is a schematic perspective view illustrating the detailed composition of the embryo loading device according to the invention with the guide bar but without the sides and the upper side of two shaped box frames.
Figure 5:
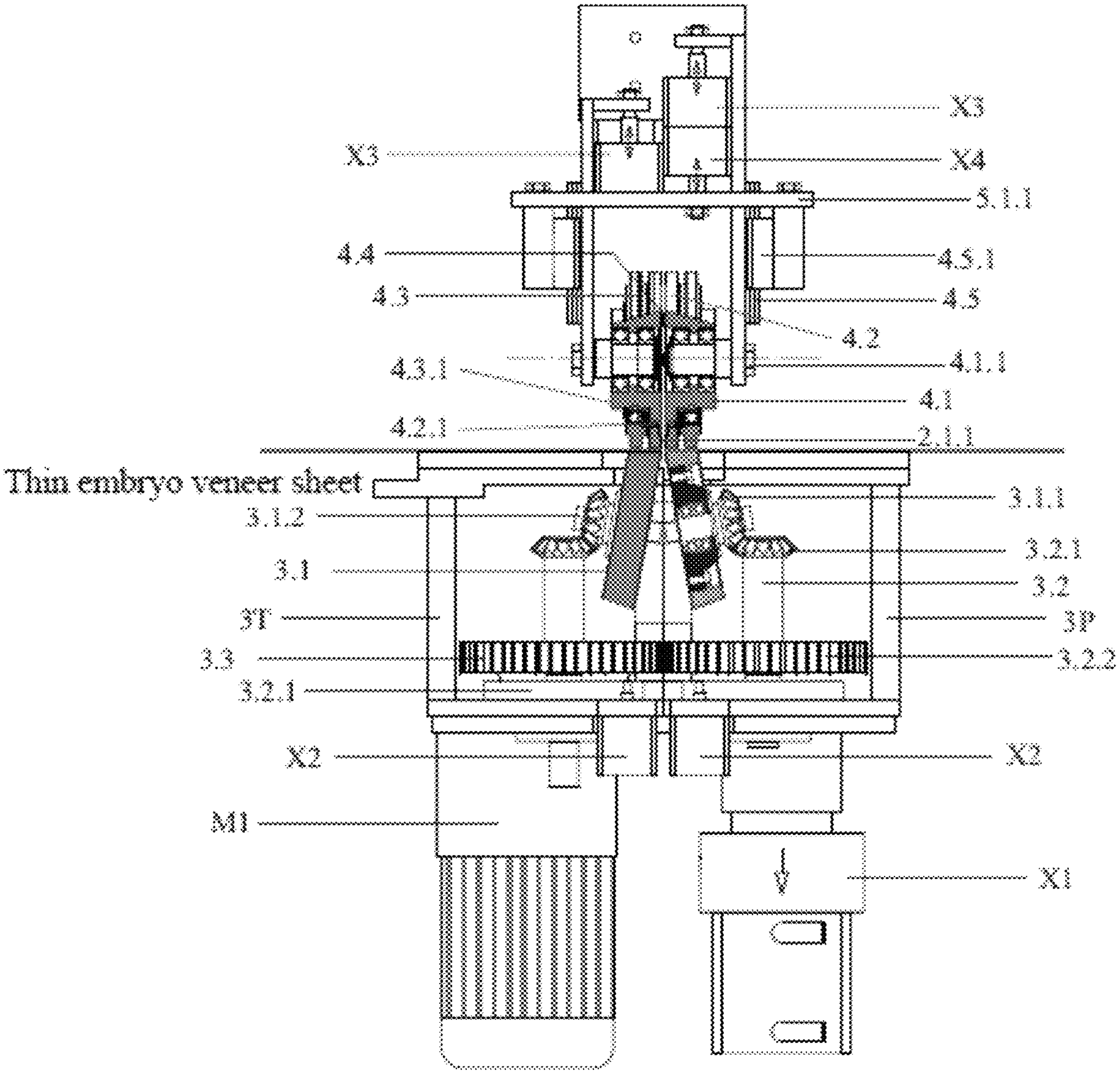
FIG. 5 is a schematic front view illustrating the embryo loading device according to the invention.
Figure 6A:
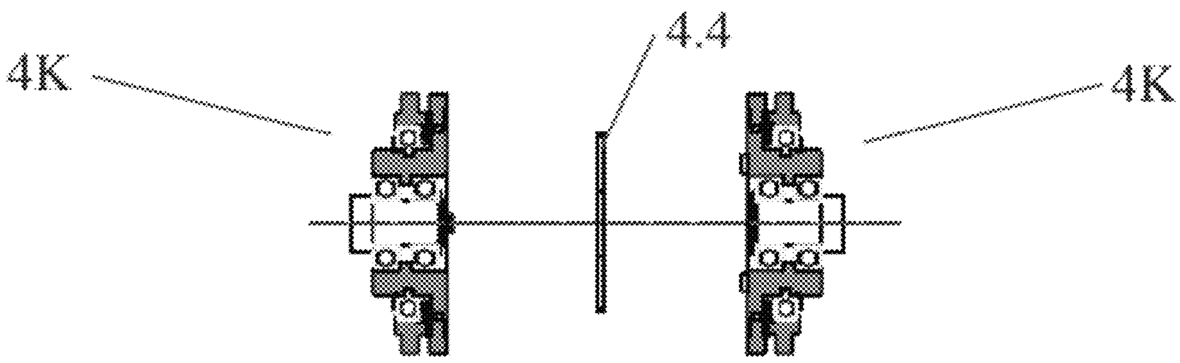
FIG. 6*a* is a drawing showing a structure cross section of two double rolling wheels and a polycentric coupling and FIG. 6*b* is a perspective drawing showing the detailed composition of the two double rolling wheels and a polycentric coupling in the embryo loading device according to the invention.
Figure 6B:
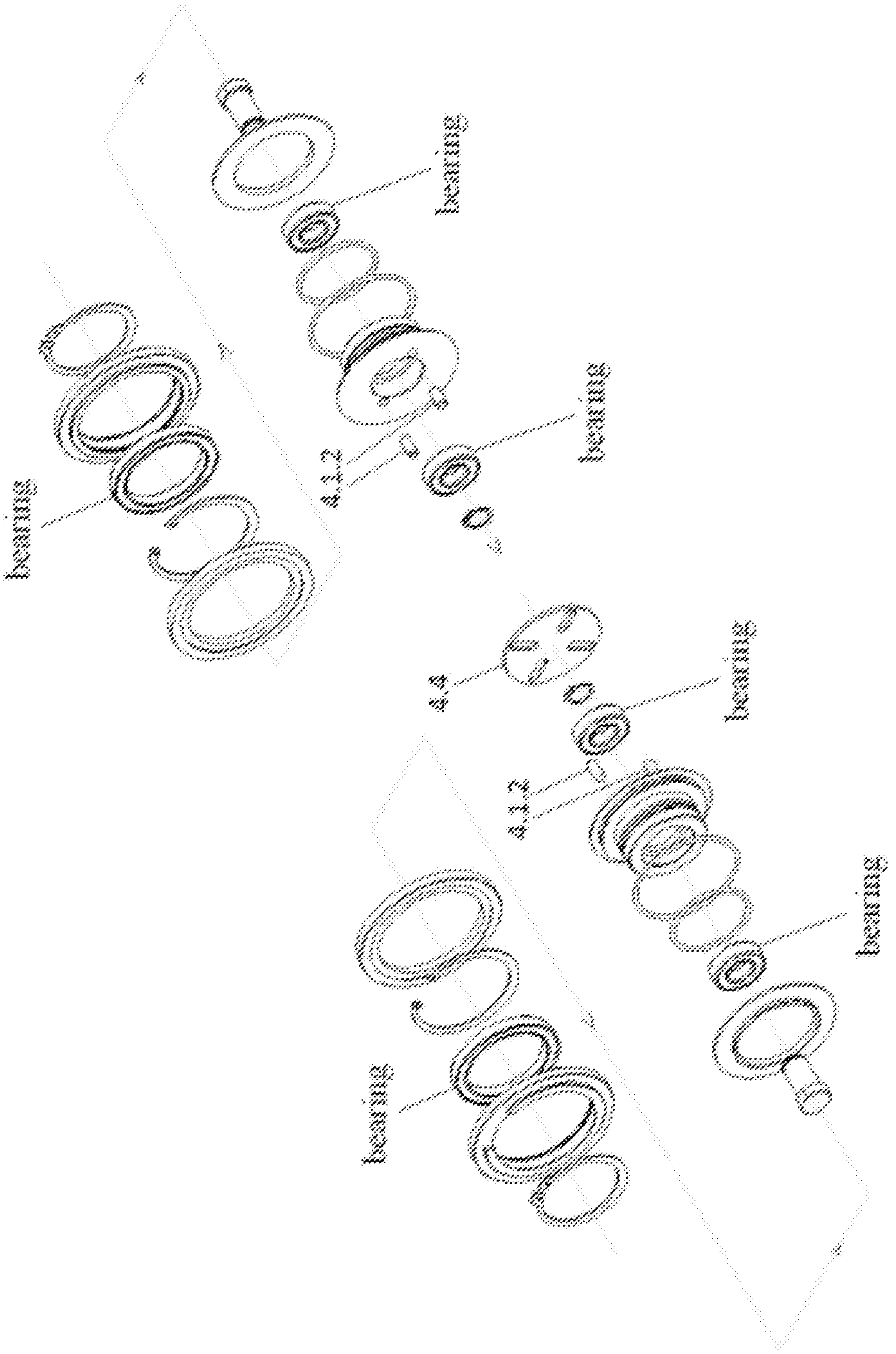

As shown in FIGS. 3-5, the clutch gear wheel 3 is arranged below both sides of guide bar 2.1.

The left shaped box frame 3T and the right shaped box frame 3P are installed opposite and close to each other, the top of the box-shaped frames 3T and 3P being below the sliding table 2 and on either side of the guide bar 2.1. The vertical faces inside the left and right box-shaped frames 3T,3P are designed to tilt outward at an angle of about 10° and have a hole to tighten the clutch wheel 3.1.

A pair of clutch wheels 3.1 with an outward tilt an angle of 10° are designed opposite each other, wherein one is arranged in the right box-shaped frame 3P and other is arranged in the left box-shaped frame 3T, and close to the guide bar bulkhead 2.1.1 of guide bar 2.1. The surface of the clutch wheel is roughened, each side of the small end of each clutch wheel is installed a bevel gear 3.1.1 being rotatable around the bevel wheel axis 3.1.2 thanks to the connection with two bearings located in the middle of the shaft. One end of gear shaft 3.1.2 is fixed to the inner surface of the vertical side of the shaped box frame and tilted at an angle 10° so that gear shaft 3.1.2 lies diagonally with guide bar 2.1 and tilts down at an angle 10° so that the top surfaces of the box-shaped frames 3T and 3P are always below the sliding table 2. (FIGS. 4-5).

Two identical drive shafts 3.2 are installed vertically and opposite each other. One is provided in the left box-shaped frame 3T and the other is provided in the right box-shaped frame 3P. Gear 3.2.1 is installed on the head of each drive shaft 3.2. The gear 3.2.1 and gear 3.1.1 have the same number of teeth. The gears 3.1.1 are arranged at the tip of clutch gear wheel 3.1. Each gear 3.2.2 has the same number of teeth as that of each drive shaft 3.2 and is arranged in the center of the drive shaft 3.2. The lower part of the two drive shafts 3.2 is tightly mounted to the floor of each box frame through a round hole that matches the bearing.

The gear 3.3 is installed with motor M1 to drive gear 3.2.1 and gear 3.2.2. The clutch gear 3.1.1 will rotate with the same number of revolutions as clutch gear 3.2.2. but in the opposite directions to each other. The pair of clutch wheels 3.1 placed opposite to each other will rotate with the same number of revolutions and in the same direction (FIG. 5).

The motor M1 used is a gear reducer motor that is tightly bolted to the underside of the left shaped box frame 3T. Gear 3.3 is linked to the shaft of the motor M1 through a mechanism (not shown in the drawings) that has the rotation transmission function.

The rolling wheel part 4 is formed by a pair of dual rolling wheels 4K that comprises a rolling wheel rim 4.1 having a separate shaft with two thin rolling wheels, a main rolling wheel 4.2, an auxiliary rolling wheel 4.3, a polycentric coupling 4.4 and a sliding bar 4.5.

A pair of dual rolling wheels 4K are arranged upper the pair of clutch wheels 3.1, a horizontal shaft of the double rolling wheels 4K are perpendicular to the guide bar 2.1 and opposite to the sides of the guide bar bulkhead 2.1.1. The pair of double rolling wheels 4K rotating freely can be shrugged up and pressed down with adjustable pressure. Each double rolling wheel 4K has a separate shaft that is made up of a rolling wheel rim 4.1 that can rotate round the rolling wheel shafts 4.1.1 by linking between two bearings. The rolling wheel shafts 4.1.1 are fitted on the inside surface of the lower body of the sliding bar 4.5.

The circular surface around the rolling wheel rim 4.1 has a large diameter part used to mount the main rolling wheel 4.2, a rubber ring (oring) 4.2.1 is placed in the middle of the main rolling wheel and the surface of the large diameter part.

The oring ring 4.2.1 installed into the groove on the surface of the large diameter part of the rolling wheel rim 4.1 has the function of making the main rolling wheel 4.2 can bounce up and down eccentrically with the rolling wheel shaft when the machine operates, the outer edge of the large diameter part is a stop ring that keeps the main rolling wheel 4.2 from skewing out (FIG. 5).

The auxiliary rolling wheel 4.3 is a circular rim with an outer diameter equal to the outer diameter of the main rolling wheel 4.2 and can rotate freely thanks to the connection of the bearing with the surface of the small diameter part of the rolling wheel rim 4.1. A rubber o'ring gasket 4.3.1 is placed between the inner circular surface of the auxiliary roller wheel 4.3 and the outer circular surface of the auxiliary.

The rubber o'ring gasket 4.3.1 installed into the groove on the inside of the auxiliary rolling wheel 4.3 has the function of making the auxiliary rolling wheel 4.3 move up-down eccentrically with the rolling wheel rim 4.1 when the machine operates. On the side of the large diameter part of the rolling wheel rim 4.1, there are two sliding latches 4.1.2. The two sliding latches 4.1.2 are placed apart from each other so that the center of the main rolling wheel rim becomes the midpoint of the straight line between the two sliding pins.

The main rolling wheel 4.2 and the auxiliary rolling wheel 4.3 have the outside diameter as the same, the round surface of main rolling wheel 4.2 and the auxiliary rolling wheel 4.3 are made smoothly or rough with small to large roughness. The main rolling wheel and the auxiliary rolling wheel rotate separately, without adhering to each other.

The polycentric coupling 4.4 is arranged between two main rolling wheels 4.2 and close to each other. The polycentric coupling 4.4 has a coin shape, on the face of the polycentric coupling 4.4 there are four sliding grooves that are arranged evenly, and all are facing the center. The width of the slide way is equal to the size of the sliding latch arranged on the side of each rolling wheel rim 4.1 and the length of the slide way is sufficient so that when the multicenter coupling mechanism 4.4 operates, the two main rolling wheels 4.2 of the two double rolling wheels 4K near by each other move at the same time with the same number of revolutions.

Two sliding rails are installed into two drive sliding rails 4.5.1, the upper body of each sliding rails 4.5 is fixed to the head of a compression cylinder X3, with the function to make two dual rolling wheels 4K to be pressed down the upper face of the veneer sheets with adjustable pressure.

The polycentric coupling 4.4 is arranged between two dual rolling wheels 4K. A pair of dual rolling wheels 4.4 that comprises the parts assembled in the following order: outer ring-auxiliary rolling wheel 4.3-bearings-inner ring-main rolling wheels 4.2-rolling wheel shaft 4.1.1-rubber o'ring gaskets 4.3.1-main rolling o'ring gaskets 4.2.1-rolling wheel rim 4.1-shaft seal ring-polycentric coupling 4.4 and sliding latch 4.1.2.

Figure 7:
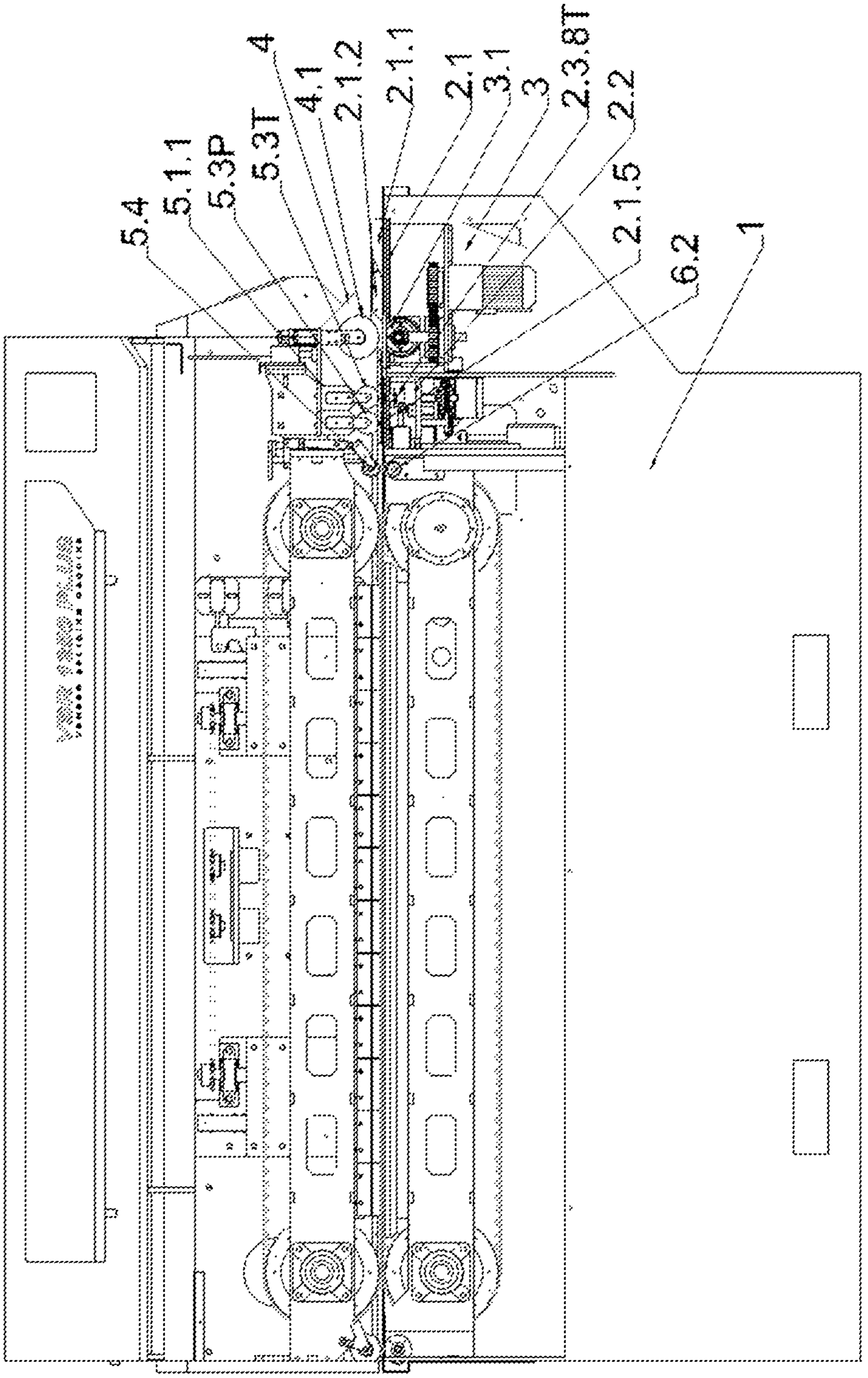
FIG. 7 is a schematic left view illustrating the embryo loading device according to the invention that is linked with other parts in the veneer horizontal jointing machine.

According to FIG. 7, the clutch gear wheel part 3 is arranged below two guide bars 2.1, the upper side of the guide bar 2.1 is on par with the upper surface of the sliding table 2 of the machine body 1. The rolling wheel part 4 is arranged at the upper the clutch gear wheel part 3 and is attached to the horizontal platform 5.1.1 at the head of the upper tension frame 5.1 of the hinge chain parts above 5. A horizontal shaft rolling wheel on left 5.3T front and a horizontal shaft rolling wheel on right 5.3P behind are arranged above the glue applicator 2.2. Below the horizontal shaft rolling wheel on left 5.3T there is a left wheel and below the horizontal shaft rolling wheel on right 5.3P there is a right wheel (not shown in the drawings.).

A cover piece 2.1.5 is arranged opposite the guide bar 2.1 and the horizontal shaft rolling wheel on right 5.3P, the upper surface of the cover piece 2.1.5 put on par with and connected to the bottom edge of the slot and the edges of the sliding table 2 used to lift up the veneer sheet to curve of the slot, and also to cover the head of the glue applicator 2.2 that is put along the same side of the guide bar 2.1. A glue storage box (not shown in the drawings) is arranged under the surface of sliding table 2 and the guide bar 2.1, and on the glue splint 2.1.3. Two feeding splint 2.1.2 on both sides of the guide bar can be curved into a wide mouth for easy loading of two veneer sheets at the same time.

Pair of horizontal wheels 6.2 at the end part of guide bar 2.1 are arranged under the sliding table 2. The outer circle of the horizontal wheel 6.2 is tangential to the upper surface of the sliding table 2. A horizontal shaft gear 5.4 installed on the horizontal wheel 6.2 is pressed from top to bottom with adjustable pressure.

The hinge chain part above 5 comprises an upper tension frame 5.1 driven by two upper horizontal sprockets 5.2. The hinge chain part above 5 can be adjusted forward or down by two vertical screws 7 is driven to rotary in the same direction and at the same speed by the chain drive.

The two screw drives of the two vertical screws 7 are fastened to the upper tension frame 5.1 of the upper hinge chain parts 5 and linked to vertical pillar 7.1, which is symmetric with the upper hinge chain parts 5.

The under-hinge chain parts 6 has the same structure as the upper hinge chain parts 5 and it is arranged symmetrically with the upper hinge chain parts 5 and permanently under the sliding table 2. The upper outer surface of the under-hinge chain parts 6 is stretched on par with the surface of the sliding table 2, while the under outer surface of the upper hinge chain parts 5 is tensioned and forms with the sliding table 2 a gap is equal to the thickness of a veneer. The under hinged chain parts 6 can be moved by two under tension frame 6.1. Viewing from above in the direction of loading the veneer sheet, the two lines of the upper and under hinge chains are stretched without parallel each other, and between them there will be a small gap that as deeper will be as narrower. A heating device to dry the glue (not shown in the drawings) is arranged in the middle of this distance thereof.

The pair of end horizontal wheel 6.3 and the pair of end horizontal rollers 5.5 located behind of the machine has the function of bringing the connected veneer board through the sliding table 2 out from the machine to receive the finished product.

The pair of the clutch gear wheels 2.1, a left feed wheel of the left rolling wheels 5.3T and a right feed wheel of the right rolling wheels 5.3P below the surface of the sliding table 2 together with the middle horizontal wheel pair 6.2 and the end horizontal wheel pair 6.3 are rotating driven to move the veneer board across to the sliding table 2 with a speed of about from 30 m/min to 40 m/min as the same as the speed of the upper hinge chain parts 5 and the under hinge chain parts 6.

The front left rolling wheel 5.3T, the behind right rolling wheel 5.3P, the middle horizontal roller 5.4 and the pair of end horizontal rollers 5.5 fixed to upper tension frame 5.1 of the upper hinge chain parts 5 and all are lifted when upper hinge chain member 5 is raised.

Figure 8A:
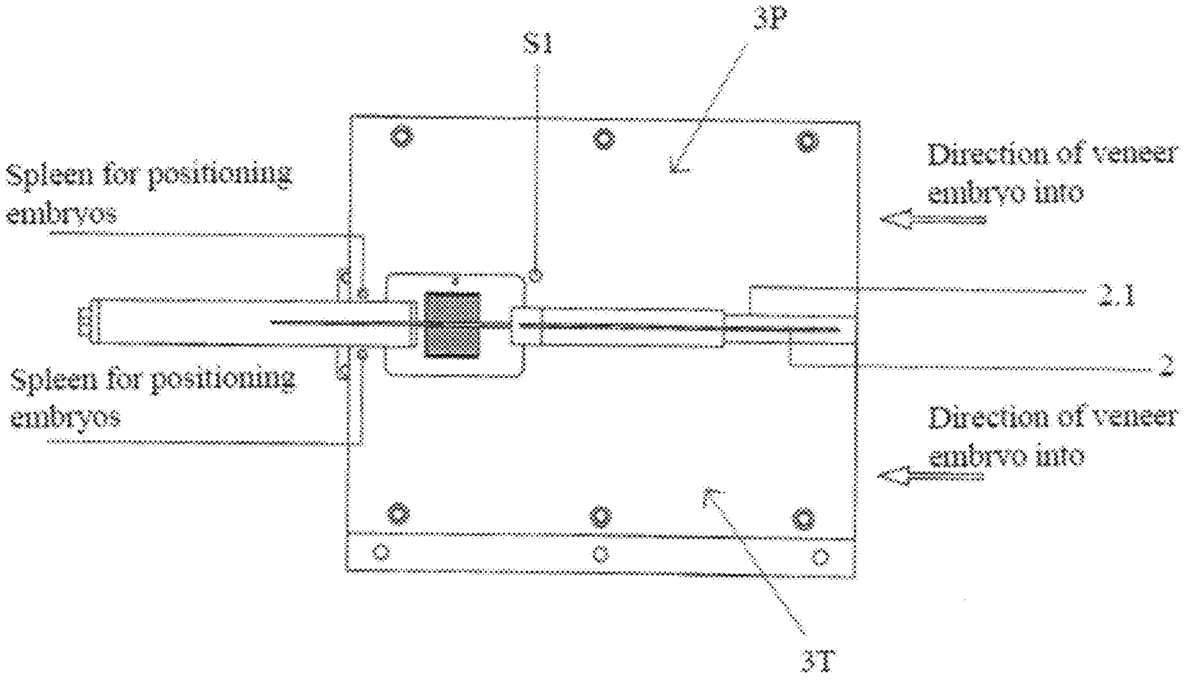
FIG. 8*a* is a schematic view illustrating two shaped box frames with the clutch gear wheel arranged under the guide bar.

According to FIG. 8*a*, two box-shaped frames are installed below both sides of the guide bar 2.1 upper the sliding table surface 2. The outer edge of the top of two box-shaped frames 3T and 3P have holes to fix the outside walls of the box frame with bolts. There is also a round hole on the surface of the right box-shaped frame 3P to install the S1 embryo-receiving optical sensor. The inner edge of the top of the two box-shaped frames has a space that is enough to fit the protruding wings on both sides of the bar 2.1 and in the middle of each wing has a space that enough to install the clutch wheel 3.1.

Figure 8B:
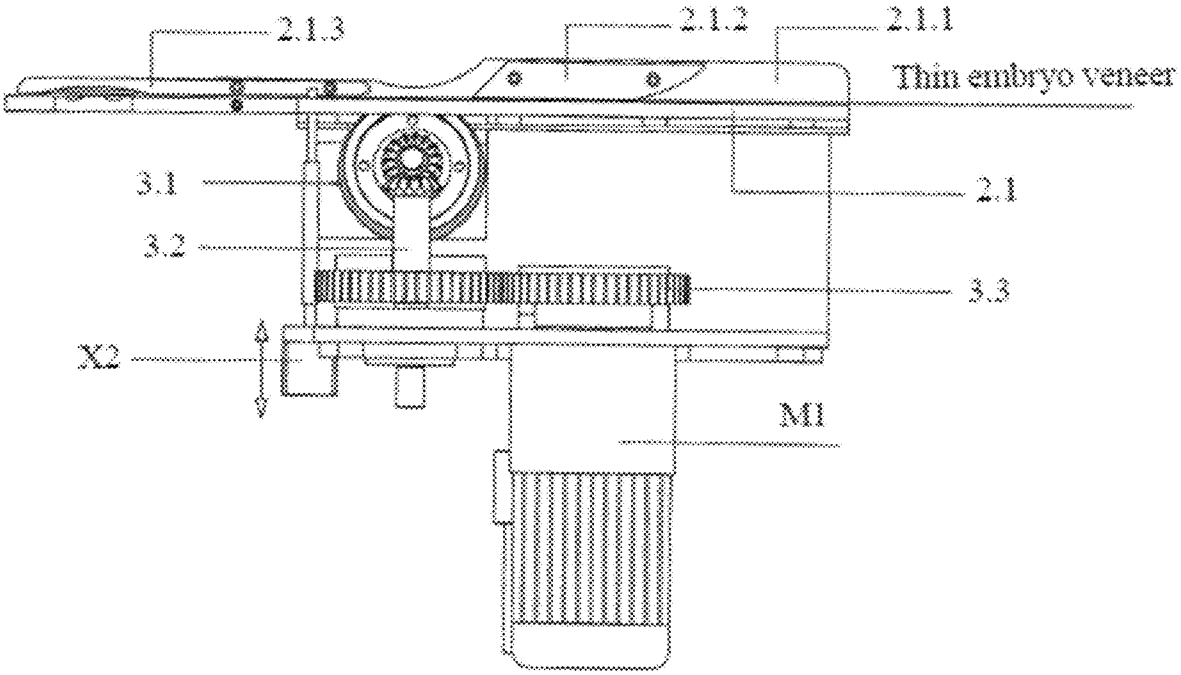
FIG. 8*b* is a schematic view illustrating the guide bar together with the other parts of the embryo loading device according to the invention.

According to FIG. 8*b*, the clutch gear wheel 3.1 is arranged to protrude on par with the upper surface of the left box-shaped frame 3T and is below the guide bar 2.1, the guide bar bulkhead 2.1.1, the feeding splint 2.1.2 and the glue splint 2.1.3. The end head of the box-shaped frames 3T and 3P have holes for fitting with the cylinder head of the positioning air cylinder X2 so that the cylinder head can protrude up and down off the upper face of the shaped box frame and two bodies of this cylinder are fitted on the under face of two shaped box frames 3T and 3P. The gear reducer motor M1 is fitted to the under face of the left box-shaped frame 3T and is connected to gear 3.3 via the motor shaft.

Figure 9A:
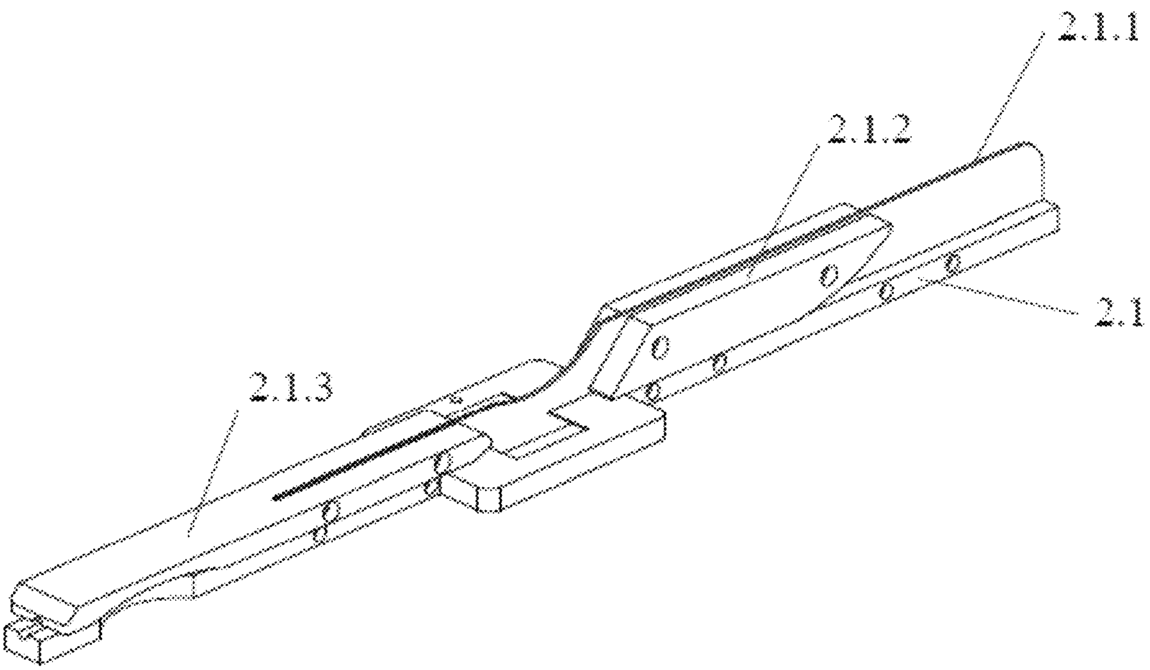
FIG. 9*a* is a schematic perspective view illustrating the guide bar in the embryo loading device according to the invention used for thin veneer sheet.

According to FIG. 9*a*, the guide bar 2.1 comprises the guide bar bulkhead 2.1.1, two feeding splint 2.1.2 on both sides of the guide bar bulkhead 2.1.1 and the glue splint 2.1.3 is attached to the end of the guide bar bulkhead 2.1.1.

All the underside of the feeding splint 2.1.2 and the glue splint 2.1.3 are combined with the vertical faces of the guide bar bulkhead 2.1.1. The upper sides of the guide bar 2.1 created two guide slots on both sides of the guide bar 2.1. Plate cover 2.1.5 is placed on the protruding glue roller of the glue applicator 2.2, each cover piece 2.1.5 is bent so that the two curved ends of the cover piece connect to sliding table 2. Taper wheel 3.1 is installed on both sides of guide bar 2.1. (FIG. 7).

Figure 9B:
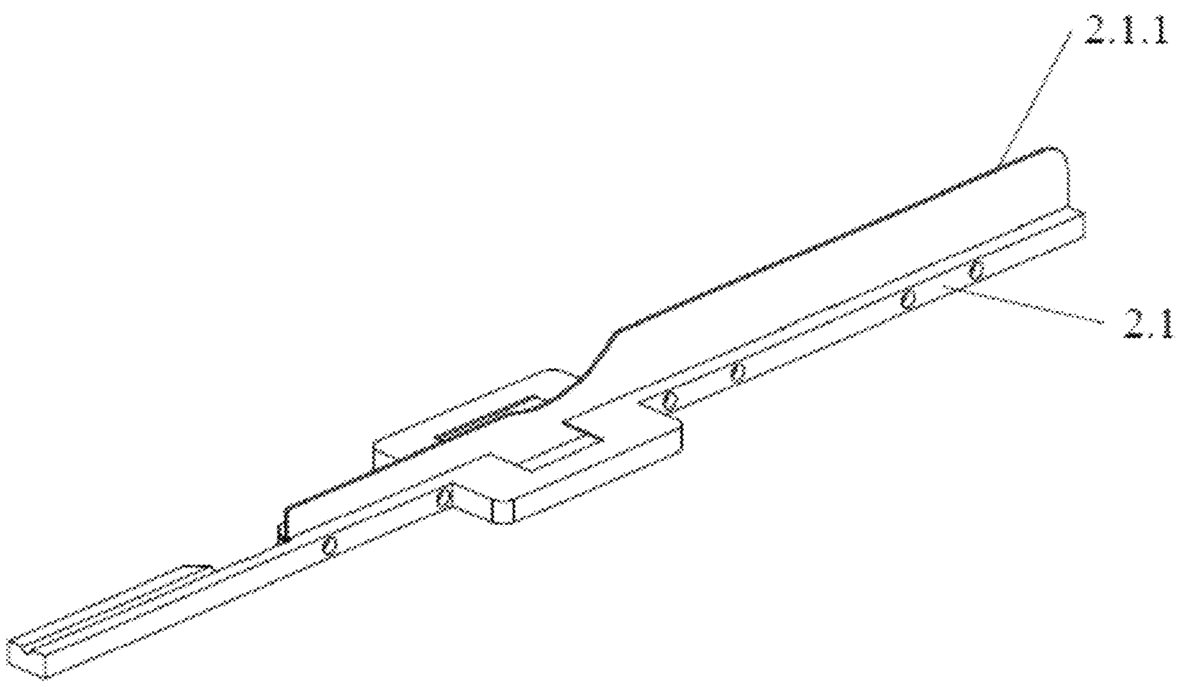
FIG. 9*b* is a schematic perspective view illustrating the guide bar in the embryo loading device according to the invention used for thick veneer sheet.

FIG. 9*b* is showing a perspective view of guide bar 2.1 used for thick veneer sheets. As shown in FIG. 8*b*, the guide bar 2.1 in this case comprises only the guide bar bulkhead 2.1.1, but without two feeding splints 2.1.2 on either side of the bulkhead and without the glue splint 2.1.3 at the end of the guide bar bulkhead 2.1.1. The vertical side on the right side of guide bar 2.1 is formed into a horizontal sphere, the left wing of guide bar 2.1 has a space to install the left clutch wheel 3.1.

Figure 10:
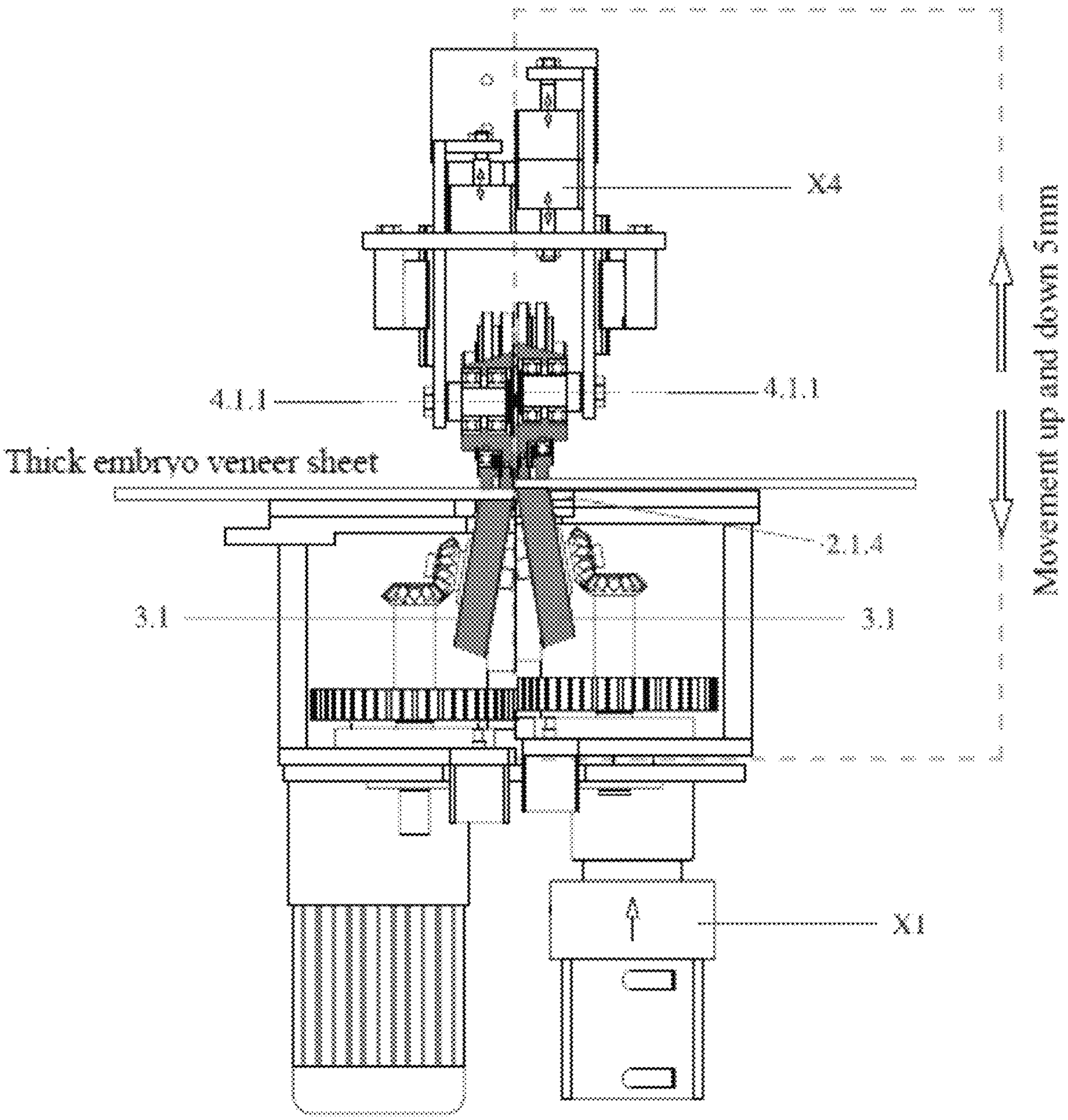
FIG. 10 is a schematic front view illustrating the vertical projection in front of the embryo loading device according to the invention when the right shaped box frame with the clutch gear wheel and the double rolling wheel is lifted.
Figure 11A:
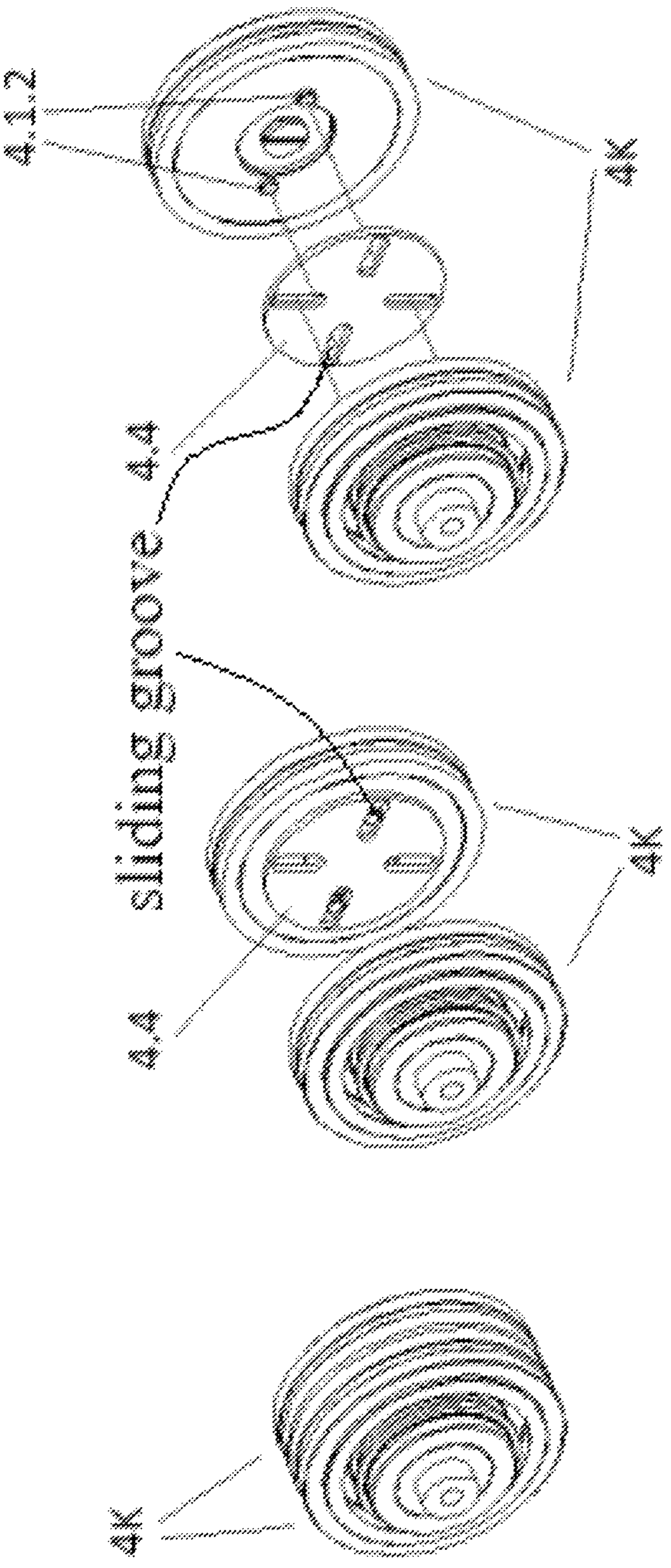
FIG. 11*a* is a schematic perspective view illustrating the movement of the polycentric coupling when two double rolling wheels are concentrically operated together.
Figure 11B:
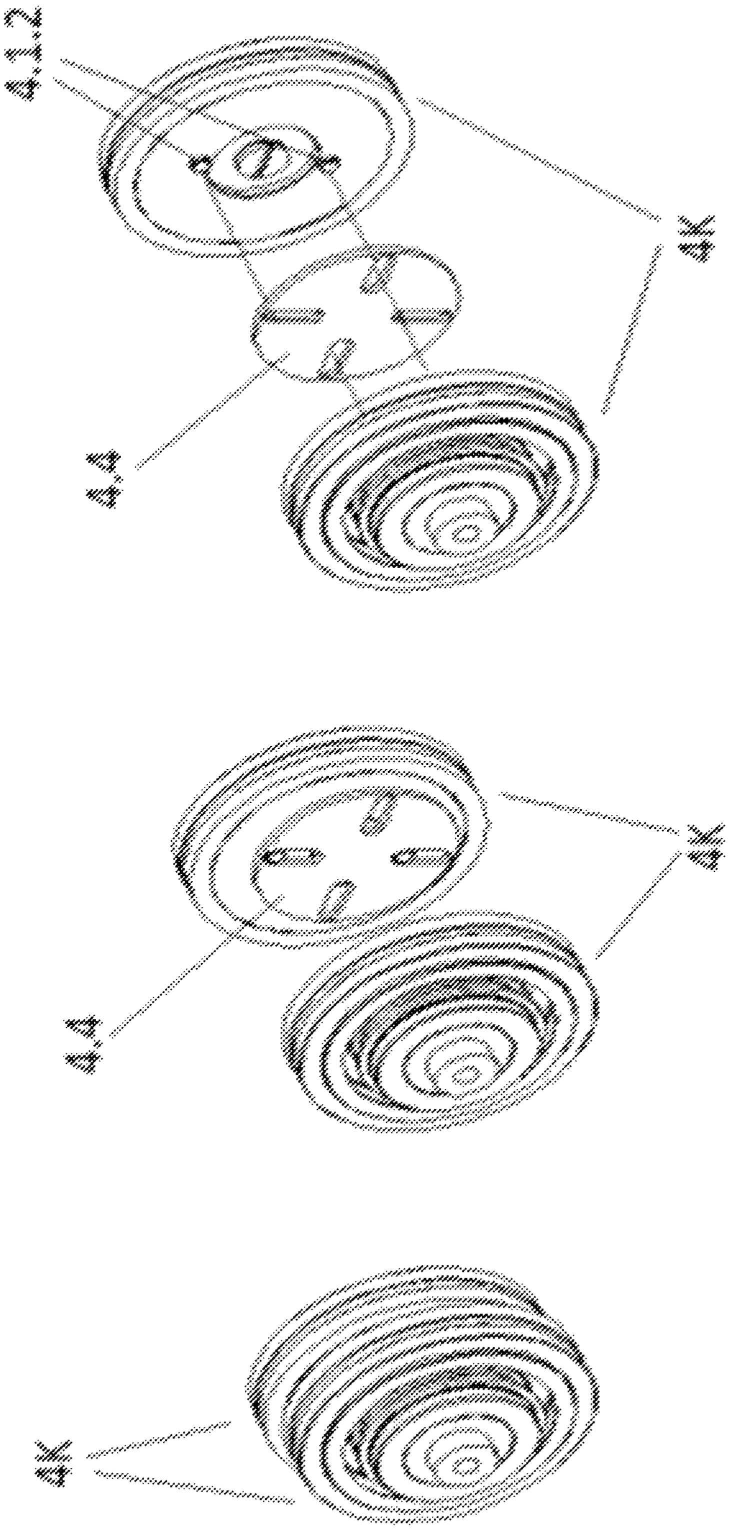
FIG. 11*b* is a schematic perspective view illustrating the movement of the polycentric coupling when two double rolling wheels are eccentrically operated together in the embryo loading device according to the invention.

As shown in FIG. 10, when the veneer embryo has a thickness of 1.2 mm to 5 mm, the right clutch wheel 3.1 will be lifted to 5 mm thanks to the lifting cylinder X1 in the clutch wheel part 3 that is arranged under the sliding table 2, at the same time, the dual rolling wheel with the right rolling shaft 4.1.1 is also lifted to 5 mm thanks to the lifting cylinder X4 in the rolling wheel part 4 that is arranged upper the sliding table 2 so that the veneer sheet on the right to be higher than the veneer sheet on the left about 5 mm when they are loaded into the machine. FIG. 11*a* is a schematic perspective view illustrating the movement of the polycentric coupling when two double rolling wheels are concentrically operated together. FIG. 11*b* is a schematic perspective view illustrating the movement of the polycentric coupling when two double rolling wheels are eccentrically operated together in the embryo loading device according to the invention.

Figure 12:
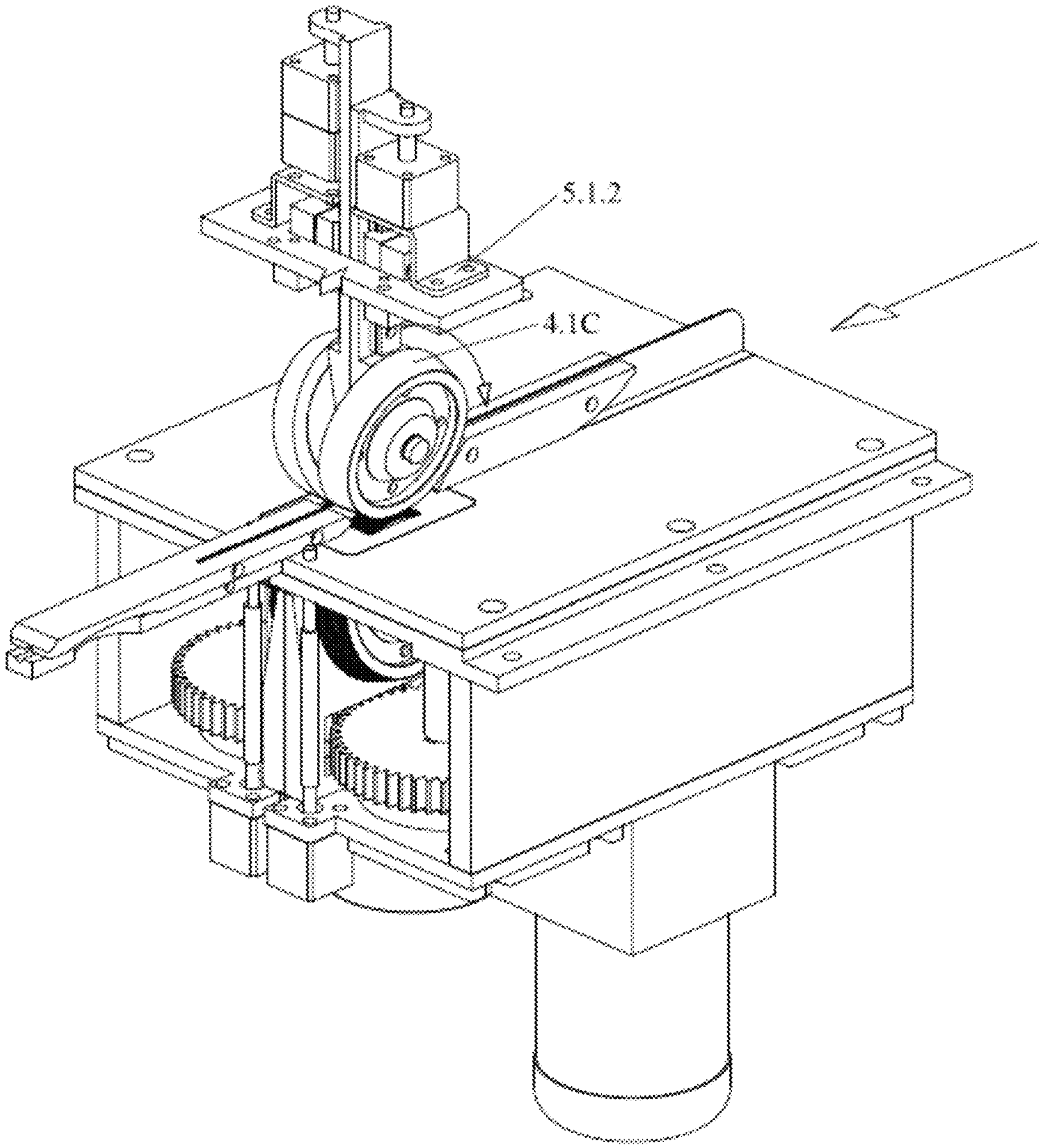
FIG. 12 is a perspective drawing showing the embryo loading device according to a second embodiment of the invention, wherein the two double rolling wheels are replaced by the two clutched rollers.
Figure 13:
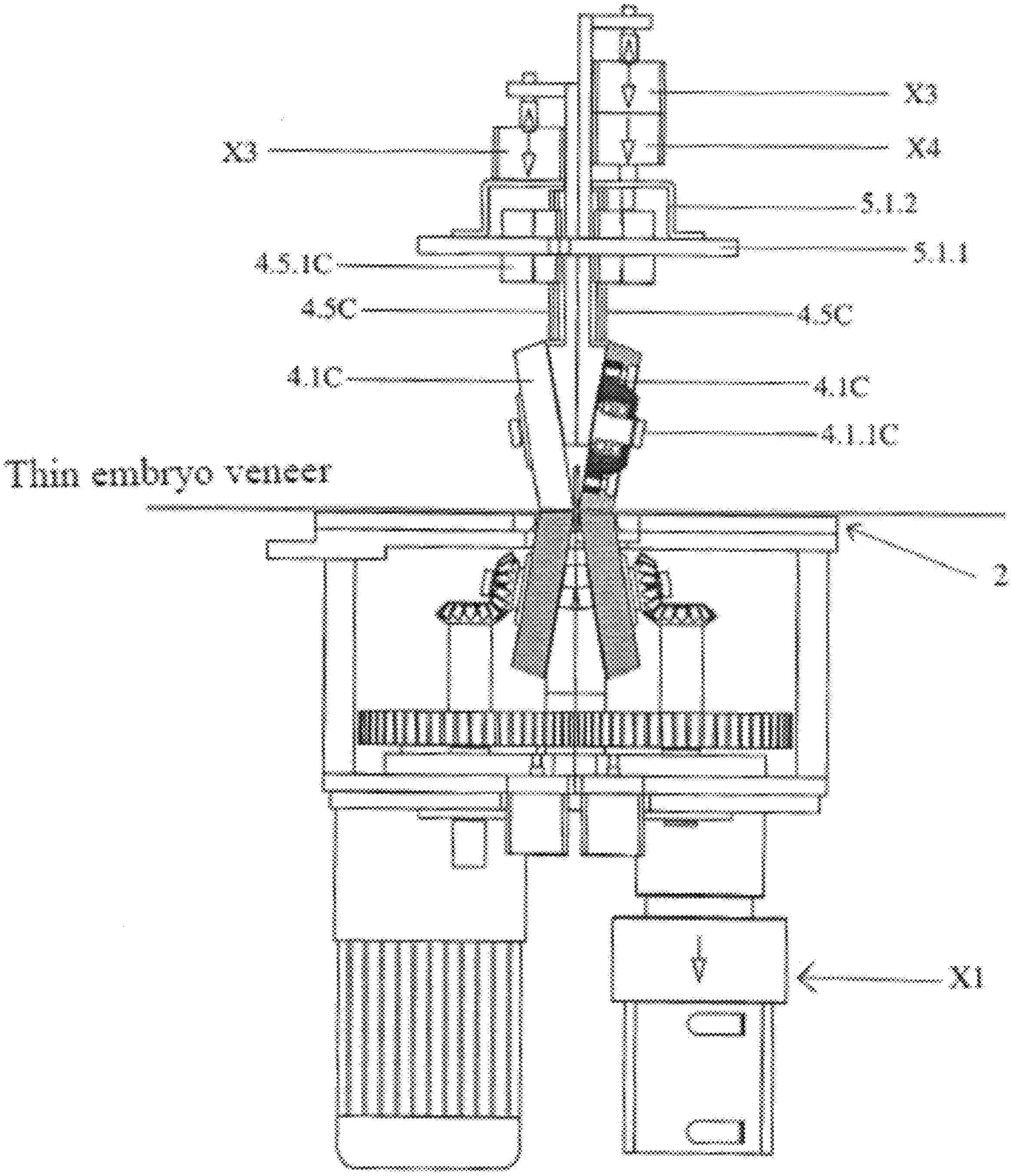
FIG. 13 is a drawing showing the projection in front of the embryo loading device according to a second embodiment of the invention, wherein the two double rolling wheels are replaced by the two clutched rollers with related parts, the right clutch gear wheel and clutched roller are lifted.

According to FIGS. 12-13, the embryo loading device used for the veneer splicing machine according to the second embodiment of the invention, wherein two clutched rollers 4.1C are replaced for the two dual rolling wheels 4K according to the first embodiment of the invention.

These two clutched rollers 4.1C are arranged opposite each other and designed like to the form with the two clutched rollers in the first embodiment, but the taper and tilt of the shaft thereof may be equal to or less than or bigger than the taper of the clutch wheel in the lower gear section, and the thickness and diameter of the clutch wheel may also be equal to or smaller or bigger than the clutch wheel 3.1 in the clutch gear wheel parts 3 below. The inclined direction of the shaft is coinciding with the inclined direction of the clutch wheel 3.1.

The conical surfaces of the clutched rollers 4.1C are made smooth or rough with a roughness of less or more so that the effect is consistent with reality. The clutch roller 4.1C is rotated freely, without driving by the clutch roller shaft 4.1.1C, that is linked via two bearings, which are fastened to the under end of each sliding rail 4.5C with the inclined vertical surface so that the clutched roller 4.1C is also inclined to the small conical head about 10 degrees so that the birth path where the contact with the surface of the veneer board is always horizontal corresponding and symmetrical with the clutch wheel 3.1 in the clutch gear wheel part 3, which is arranged below the sliding table 2.

Two clutched rolling wheels 4.1C opposed each other via two sliding rails 4.5C are arranged opposite each other and near side by side. Two clutched rolling wheels 4.1C can slide up and down together on two back faces of two clutched rolling wheels 4.1C thanks to the two sliding rails 4.5.1C that are fitted horizontal into the vertical side in the sides of two empty spaces on the horizontal platform 5.1.1, the head on each sliding rail is arranged a horizontal bar with a hole used to fix the accumulator tip of the compression cylinder X3, while the left side of the base of the compression cylinder X3 is fixed to the left of the pad 5.1.2 and the right side of the base of the compression cylinder X3 is fixed to the base of the lifting cylinder X4. The head of the lifting cylinder X4 facing down is fitted to the right of the pad 5.1.2, the leg of the pad 5.1.2 is fixed on the horizontal platform 5.1.1 while lifting cylinder X4 is controlled up lower to load a veneer sheet during the machine operating.

Figure 14:
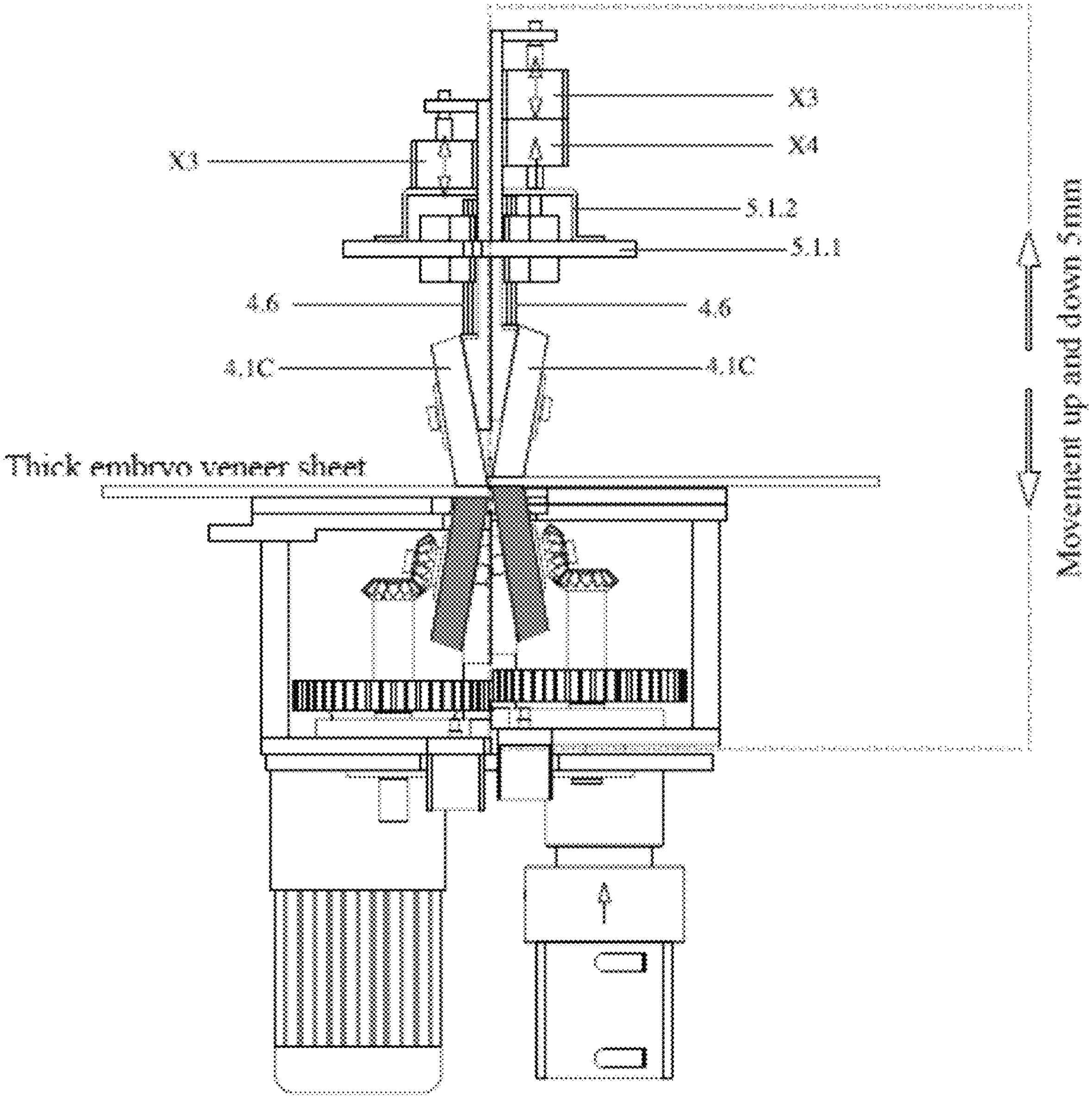
FIG. 14 is a drawing showing the projection in front of the embryo loading device according to a second embodiment of the invention, wherein the two double rolling wheels are replaced by the two clutched rollers with related parts such as: sliding rails, drives sliding rails, compression cylinder and lifting cylinder.
Figure 15:
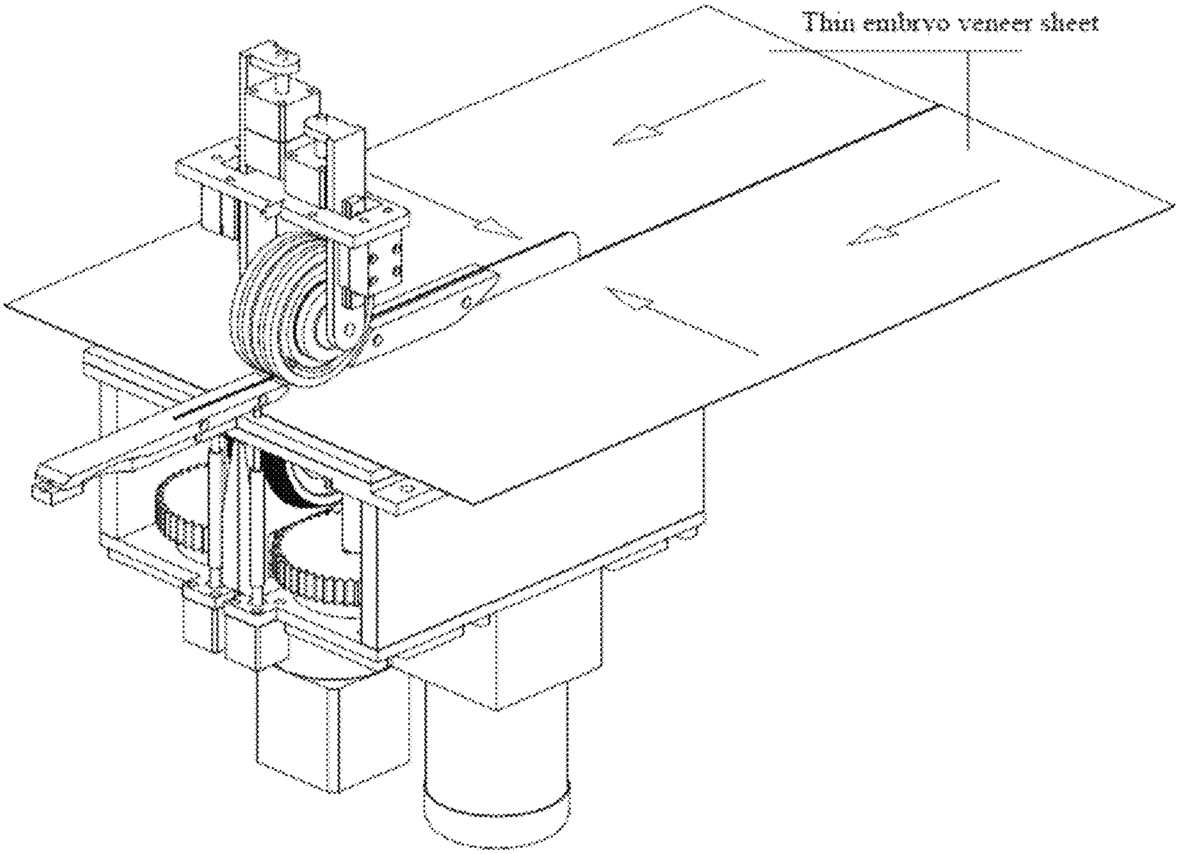
FIG. 15 is a schematic perspective view illustrating the embryo loading device according to the invention with the guide bar which is loading two thin veneer sheets.
Figure 16:
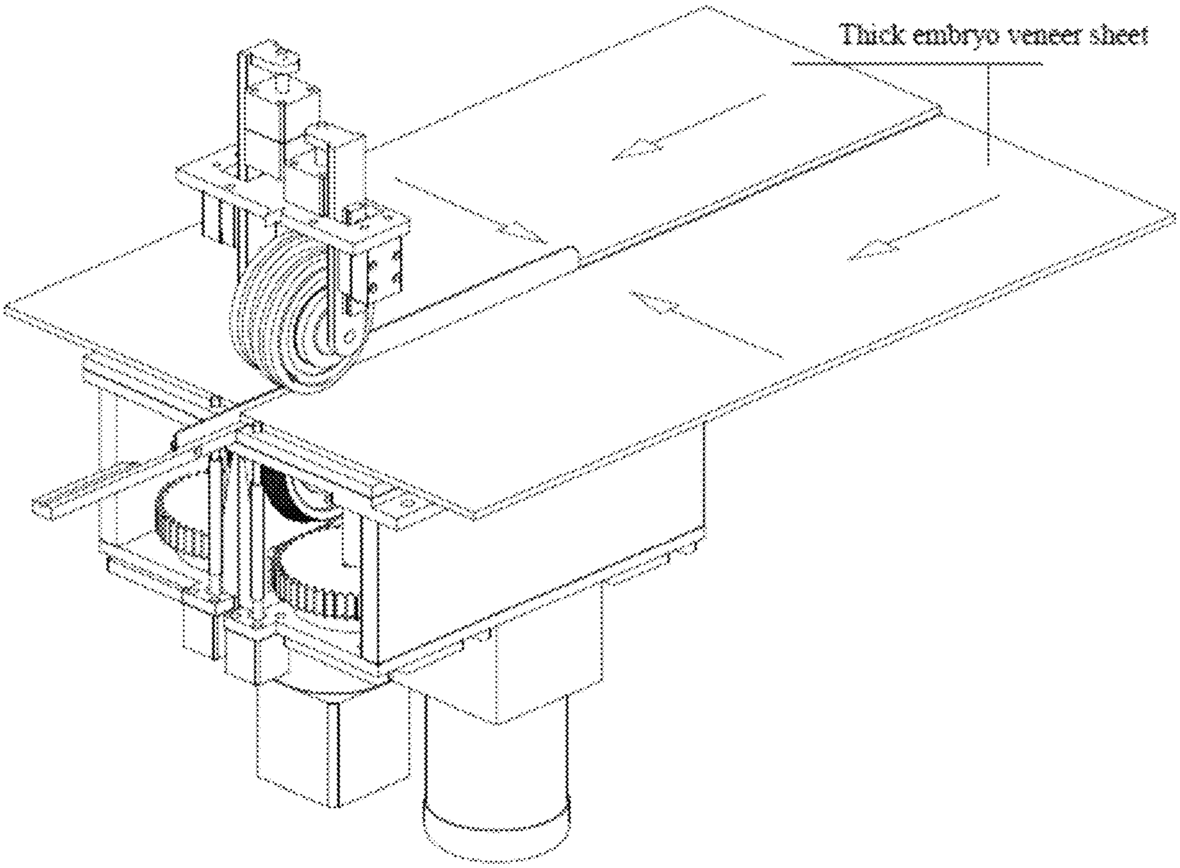
FIG. 16 is a schematic perspective view illustrating the embryo loading device according to the invention that is loading two thick veneer sheets with the guide bar but without the feeding splint, the glue splint.
Figure 17:
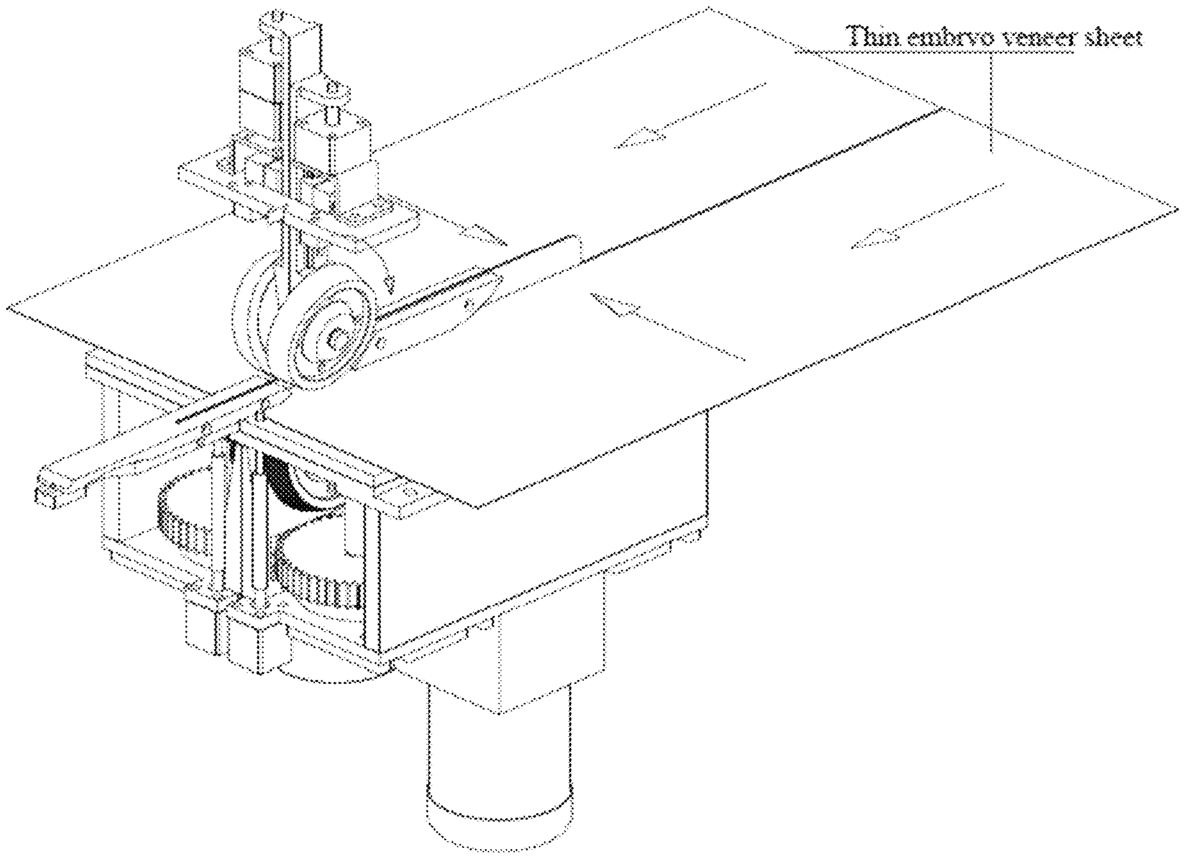
FIG. 17 is a schematic perspective view illustrating the embryo loading device according to the invention with the guide bar which is loading two thin veneer sheets.
Figure 18:
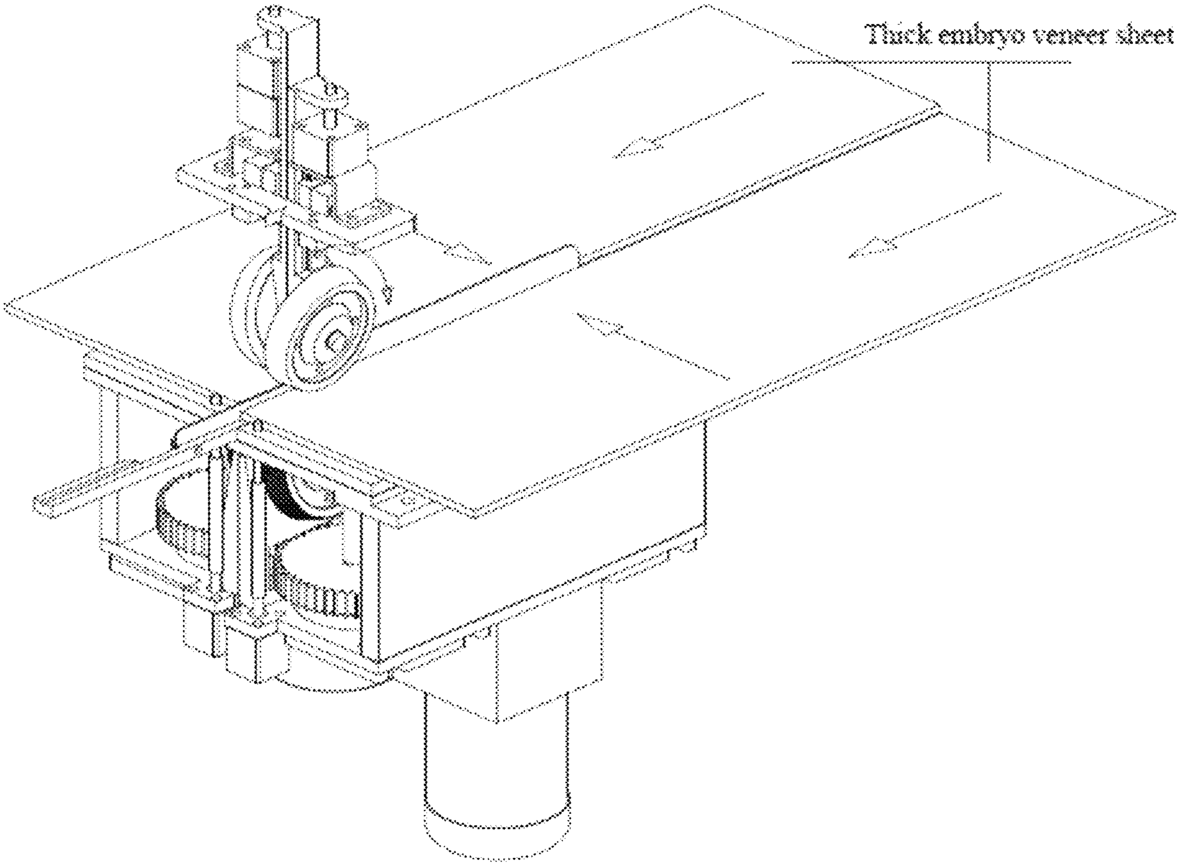
FIG. 18 is a schematic perspective view illustrating the embryo loading device according to a second embodiment of the invention using two clutched rollers instead of two double rolling wheels that is loading two thick veneer sheets.

According to FIG. 14, the embryo loading device according to the second embodiment of the invention, wherein a head of the lifting cylinder X4 facing upwards is fitted to the right of the pad 5.1.2, the leg of the pad 5.1.2 is fixed on the horizontal platform 5.1.1 while the lifting cylinder X4 is lifted up high so that the right clutched rollers 4.1C can also be lifted up high about 5 mm and the right clutched wheel 3.1 in the right box frame 3P with the other related parts in the clutch gear wheel parts 3 are also lifted up high 5 mm to operate when loading thick veneer board.

BEST MODE FOR CARRYING OUT THE INVENTION

According to FIGS. 15-18, when the machine is operated with loading and without loading, the rolling wheel part 4 of the embryo loading device according to the invention is lifted up by two compression cylinders X3.

Other parts such as: the upper hinge chain parts 5 with the left wheel 5.3T and the right rolling wheel 5.3P, the pair of rolling wheels 5.4 and the pair of rolling wheels 5.5 are lowered by two vertical screws 7 far from the surface of the sliding table 2 a distance that is smaller than the thickness of the veneer sheet.

The parts under the surface of sliding table 2 include: a pair of clutched wheels 3.1, two wheels (not shown in drawings), a pair of middle horizontal sprockets 6.2, two crawlers 6.2 together with a chain in the under hinge chain parts 6, two crawlers 5.1 together with the chain in the upper hinge chain parts 5 and a pair of end horizontal sprockets 6.3 are moved in circular motion to the direction of the rolling veneer sheet into the machine following the direction of the guide bar 2.1.

Two veneer sheets are loaded at the same time into the feeding splint at the head of guide bar 2.1 until the leading edge of the two veneer sheets is blocked by two heads of the embryo positioning cylinder X1, the same time the photoelectric sensor receiving workpiece S1 transmits a signal so that in a second later (the time is predetermined) two heads of the embryo positioning cylinder X1 leave the upper surface of the left shaped box frame 3T and right shaped box frame 3P down on par with the face of the sliding table 2, simultaneously the two double rolling wheels 4K of the rolling wheel part 4 is pressed down the upper face of the two veneer sheets by two workpiece compression cylinders X3 with the appropriate adjusted pressure. When the underside of the veneer sheet contacted with the two clutched wheel 3.1 are rotating to the direction of rolling into the machine to make two veneer sheets at the same time moving into the machine to the direction of the guide bar 2.1 and horizontal drifting toward the big head of each clutch wheel 3.1 until the sides of the two veneer sheets are pressed close to the sides of the guide bar bulkhead 2.1.1, at the same time moving into the machine.

Two main rolling wheels 4.2 of two double rolling wheels 4K close to both sides of the upper guide bar bulkhead 2.1.1, the upper side corresponds to the conical surface at the big end of the two clutch gear wheels 3.1 below, that always rotate with the same number of revolutions to create a press down effect to make the clutch gear wheel effective and at the same time also to keep the two veneer sheets always moving at the same speed.

The two auxiliary rolling wheels 4.3 of the two double rolling wheels 4K corresponds to the conical surface at the small end of the two clutch gear wheels 3.1 that presses down to create a circumference difference effect between the small end and the big end of the clutch gear wheel 3.1, in addition to the ability to shrug up and press down together with the rolling wheel shafts 4.1.1 arranged on each side of the dual rolling wheels 4K due to moving of the compression cylinder X3 via the sliding rail 4.5, the main rolling wheel 4.2 and the auxiliary wheel 4.3 that can shrug up and down slightly off eccentricity to the rolling wheel shafts 4.1.1 thanks to two main rolling o'ring gaskets 4.2.1 and auxiliary rolling wheel O-ring gaskets 4.2.1 and 4.3.1 in rubber to stabilize the interaction efficiency of the main rolling wheel 4.2 with auxiliary rolling wheel 4.3 even though the thickness and smoothness of uneven veneer sheets.

After passing through out the embryo loading device according to the invention, the veneer workpieces continues to move through the glue applicator 2.2, the left edge face of the veneer sheet is glued by the glue roller (not shown in the drawings) on the right of the guide bar 2.1 when the edge of this veneer sheet is kept by the lower left wheel 2.3.8T and the left rolling 5.3T with horizontal glue roller on the right of the guide bar 2.1 while the edge of the veneer sheet is bent according to section of the spherical guide slot above the right glue roller, followed by the right side of the veneer edge is glued by the glue roller (not shown in the drawings) to the left of the guide bar 2.1 when the edge of the veneer sheet is kept by the lower right wheel 2.3.8P on the right below and the right wheel 5.3P on the horizontal side with the glue roller on the left of the guide bar 2.1, while at the edge of the left veneer sheet is curved in a circular spherical slot above the left glue rolling shaft.

After passing throughout the glue applicator, thanks to a pair of the middle horizontal sprockets 6.2 below and a pair of the middle horizontal roller 5.4 above, the veneer sheet is moved throughout the heating device (not shown in the drawings) arranged between the two double hinged chains of the upper hinge chain parts 5 and the under hinge chain parts 6 for drying glue. After being heated to dry the glue, the two veneer sheets are stuck together into a large veneer board and is brought out by the end horizontal wheel below 6.3 and a pair of end horizontal rollers 5.5 and rolled out.

When the edge of the large veneer board passes out the embryo loading device, the photoelectric sensor receiving workpiece S1 transmit the signal to open up the double rolling wheels 4K in the rolling wheel part 4, at the same time two heads of embryo positioning cylinder X1 protruded up from the surface of the left shaped box frame 3T and the right shaped box frame 3P to load a next veneer workpieces. The machine can connect horizontal the veneer sheet one with another until the width of the two finished veneer boards are on par to the indentation of the C-shape of the machine.

The use of the embryo loading device for a veneer horizontal jointing machine according to the invention has the beneficial effects as follows.

The present invention allows the machine to load the workpiece at the same time also to put two veneer sheets in the same direction at the same speed in order to achieve high efficiency when pressing the two veneer sheets faced each other and leaned on the sides of the guide bar before the two veneer sheets continue to go through the other parts of the machine.

The present invention allows the seams of the veneer sheets to be aligned without extruding and the machine always operates stably.

With a stable pressure effect when sliding on both sides of the guide bar, the present invention allows the glued side of the veneer sheet when passing through the glue applicator is always contacted stably with the round surface of the glue splint, so that the glue on the edge of the veneer sheet has equal thickness, without thick or thin segment.

The contacting part of the upper and lower surface of the veneer sheets with the rolling wheels and the rollers is very few, and the sliding friction between the rollers and the lower surface of the veneer sheet is very low, so that the veneer sheet has no scratches and chipped peels.

What is claimed is:

1. An embryo loading device for receiving and rolling first and second veneer sheets and joining the first and second veneer sheets to each other, comprising:

a sliding table (2); a guide bar (2.1) provided on a top surface of the sliding table (2); a clutch gear wheel part (3) provided under the sliding table (2); a rolling wheel part (4) provided over the guide bar (2.1); and a pair of box-shaped frames (3T, 3P) housing the clutch gear wheel part (3), wherein a center of the rolling wheel part (4) is aligned with a center of the clutch gear wheel part (3) along a vertical direction, wherein the vertical direction is perpendicular to the top surface of the sliding table (2), wherein the pair of box-shaped frames (3T, 3P) includes:

a left box-shaped frame (3T) and a right box-shaped frame (3P), wherein the left and the right box-shaped frames (3T,3P) are provided under the sliding table (2), wherein the left box-shaped frame (3T) is provided under the sliding table (2) and on a left side of the guide bar (2.1), wherein the right box-shaped frame (3T) is provided under the sliding table (2) and on a right side of the guide bar (2.1), wherein the clutch gear wheel part (3) includes:

a pair of clutch wheels (3.1) including a first clutch wheel (3.1) and a second clutch wheel (3.1), wherein the first clutch wheel (3.1) is provided in the left box-shaped frame (3T) and the second clutch wheel (3.1) is provided in the right box-shaped frame (3T), wherein the left and the right clutch wheels (3.1) lean against each other, wherein a surface of each of the first and second clutch wheels that faces each other forms an angle of about 10 degrees with a vertical centerline extending between the first and second clutch wheels, wherein the first clutch wheel (3.1) rotates around a left clutch gear shaft (3.1.2), wherein the second clutch wheel (3.1) rotates around a right clutch gear shaft (3.1.2);

first left and first right clutch gears (3.1.1) which are respectively coupled with the first clutch wheel (3.1) and the second clutch wheel (3.1), wherein the first left clutch gear (3.1.1) is provided around the left clutch gear shaft (3.1.2), wherein the first right clutch gear (3.1.1) is provided around the right clutch gear shaft (3.1.2);

left and right gears (3.2.2) respectively coupled with the first and second clutch wheels (3.1);

left and right pinions (3.3) respectively coupled with the left and right gears (3.2.2), wherein the left and right gears (3.2.2) respectively rotate around left and right drive shafts (3.2); and second left and second right clutch gears (3.2.1) respectively provided around the left and the right drive shafts (3.2), wherein the second left and the second right clutch gears (3.2.1) are respectively gear-coupled with the first left clutch gear (3.1.1) and the first right clutch gear (3.1.1), wherein the left gear (3.2.2), the left pinion (3.3), the left drive shaft (3.2), the second left clutch gear (3.2.1), and the first left clutch gear (3.1.1) are provided in the left box-shaped frame (3T), wherein the right gear (3.2.2), the right pinion (3.3), the right drive shaft (3.2), the second right clutch gear (3.2.1), and the first right clutch gear (3.1.1) are provided in the right box-shaped frame (3P), wherein the rolling wheel part (4) includes:

a pair of rolling wheels (4K), wherein the pair of rolling wheels (4K) includes left and right main rolling wheels (4.2), wherein the left and the right main rolling wheels (4.2) respectively rotate around left and right rolling wheel shafts (4.1.1).

2. The embryo loading device according to claim 1, wherein the left box-shaped frame (3T) is in a C shape with a right side open to the right box-shaped frame (3P), wherein the right box-shaped frame (3P) is in an inverted C shape with a left side open to the left box-shaped frame (3T).

3. The embryo loading device according to claim 1, wherein the guide bar (2.1) is placed between the left box-shaped frame (3T) and the right box-shaped frame (3P), wherein the sliding table (2) includes a left sliding table (2) located to the left of the guide bar (2.1) and a right sliding table (2) located to the right of the guide bar (2.1), wherein each of the left sliding table (2) and the right sliding table (2) move up and down along the vertical direction in an independent manner from each other.

4. The embryo loading device according to claim 1, further comprising:

a left auxiliary rolling wheel (4.3) coupled with the left main rolling wheel (4.2), wherein the left auxiliary rolling wheel (4.3) is provided in parallel to the left main rolling wheel (4.2) and spaced apart from the left main rolling wheel (4.2); and a right auxiliary rolling wheel (4.3) coupled with the right main rolling wheel (4.2), wherein the right auxiliary rolling wheel (4.3) is provided in parallel to the right main rolling wheel (4.2) and spaced apart from the right main rolling wheel (4.2).

5. The embryo loading device according to claim 1, further comprising:

a polycentric coupling (4.4) provided between the left main rolling wheel (4.2) and the right main rolling wheel (4.2), wherein the polycentric coupling (4.4) is in a disc shape, wherein the left main rolling wheel (4.2) and the right main rolling wheel (4.2) are linked to each other by the polycentric coupling (4.4) and rotate with the same number of revolutions as each other.

6. The embryo loading device according to claim 5, further comprising:

a sliding groove formed through the polycentric coupling (4.4), wherein the sliding groove is an opening in a bar shape extending in a radial direction of the polycentric coupling (4.4); and a sliding pin (4.1.2) extending between the left and the right main rolling wheels (4.2) through the sliding groove, wherein the sliding pin (4.1.2) maintains connection between the left and the right main rolling wheels (4.2) by moving back and forth in the sliding groove when the left and the right main rolling wheels (4.2) eccentrically rotate with respect to each other.

7. An embryo loading device for receiving and rolling first and second veneer sheets and joining the first and second veneer sheets to each other, comprising:

a sliding table (2);

a guide bar (2.1) installed on the sliding table (2), extending in a horizontal direction, and dividing a top surface of the sliding table (2) into a left area and a right area, wherein the horizontal direction is parallel to the top surface of the sliding table (2), wherein the first veneer sheet is fed onto the sliding table (2) in the left area along the horizontal direction, wherein the second veneer sheet is fed onto the sliding table (2) in the right area along the horizontal direction;

a clutch gear wheel part (3) provided under the sliding table (2); and a rolling wheel part (4) provided over the guide bar (2.1), wherein a center of the rolling wheel part (4) is aligned with a center of the clutch gear wheel part (3) along a vertical direction, wherein the vertical direction is perpendicular to the top surface of the sliding table (2), wherein the clutch gear wheel part (3) includes:

a pair of clutch wheels (3.1) including a first clutch wheel (3.1) and a second clutch wheel (3.1), wherein the first clutch wheel (3.1) is provided in a left box-shaped frame (3T) and the second clutch wheel (3.1) is provided in a right box-shaped frame (3P), wherein the left and the right clutch wheels (3.1) lean against each other, wherein a surface of each of the first and second clutch wheels that faces each other forms first and second predetermined angles with a vertical centerline extending between the first and second clutch wheels, wherein the first clutch wheel (3.1) rotates around a left clutch gear shaft (3.1.2), wherein the second clutch wheel (3.1) rotates around a right clutch gear shaft (3.1.2);

a first left clutch gear and a first right clutch gear (3.1.1) which are respectively coupled with the first clutch wheel (3.1) and the second clutch wheel (3.1), wherein the first left clutch gear (3.1.1) is provided around the left clutch gear shaft (3.1.2), wherein the first right clutch gear (3.1.1) is provided around the right clutch gear shaft (3.1.2);

left and right gears (3.2.2) respectively coupled with the first and second clutch wheels (3.1);

left and right pinions (3.3) respectively coupled with the left and right gears (3.2.2), wherein the left and right gears (3.2.2) respectively rotate around the left and the right drive shafts (3.2); and second left and second right clutch gears (3.2.1) respectively provided around the left and the right drive shafts (3.2), wherein the second left and the second right clutch gears (3.2.1) are respectively gear-coupled with the first left clutch gear (3.1.1) and the first right clutch gear (3.1.1), wherein the left gear (3.2.2), the left pinion (3.3), the left drive shaft (3.2), the second left clutch gear (3.2.1), and the first left clutch gear (3.1.1) are provided in the left area of the sliding table (2), wherein the right gear (3.2.2), the right pinion (3.3), the right drive shaft (3.2), the second right clutch gear (3.2.1), and the first right clutch gear (3.1.1) are provided in the right area of the sliding table (2), wherein the rolling wheel part (4) includes:

a pair of rolling wheels (4K), wherein the pair of rolling wheels (4K) includes left and right main rolling wheels (4.2), wherein the left and the right main rolling wheels (4.2) respectively rotate around left and right rolling wheel shafts (4.1.1), wherein the left rolling wheel (4.2) and the left rolling wheel shaft (4.1.1) are provided in the left area of the sliding table (2), wherein the right rolling wheel (4.2) and the right rolling wheel shaft (4.1.1) are provided in the right area of the sliding table (2).

* * * * *